(12) United States Patent
Mesher

(10) Patent No.: US 10,625,760 B2
(45) Date of Patent: Apr. 21, 2020

(54) APPARATUS AND METHOD FOR CALCULATING WOODEN CROSSTIE PLATE CUT MEASUREMENTS AND RAIL SEAT ABRASION MEASUREMENTS BASED ON RAIL HEAD HEIGHT

(71) Applicant: Tetra Tech, Inc., Pasadena, CA (US)

(72) Inventor: Darel Mesher, Spruce Grove (CA)

(73) Assignee: Tetra Tech, Inc., Pasadena, CA (US)

( * ) Notice: Subject to any disclaimer, the term of this patent is extended or adjusted under 35 U.S.C. 154(b) by 0 days.

(21) Appl. No.: 16/127,956

(22) Filed: Sep. 11, 2018

(65) Prior Publication Data

US 2019/0367060 A1    Dec. 5, 2019

Related U.S. Application Data

(60) Provisional application No. 62/679,467, filed on Jun. 1, 2018.

(51) Int. Cl.
*B61L 23/04*        (2006.01)
*B61K 9/10*         (2006.01)
(Continued)

(52) U.S. Cl.
CPC ............. *B61L 23/045* (2013.01); *B61K 9/10* (2013.01); *G01S 17/88* (2013.01); *G01S 19/13* (2013.01)

(58) Field of Classification Search
CPC ......... B61L 23/045; B61K 9/10; G01S 17/88; G01S 19/13
See application file for complete search history.

(56) References Cited

U.S. PATENT DOCUMENTS 3,562,419 A    2/1971  Stewart et al.
3,942,000 A    3/1976  Dieringer
(Continued)

FOREIGN PATENT DOCUMENTS

CA    2061014 A1    8/1992
CA    2574428 A1    2/2006
(Continued)

OTHER PUBLICATIONS

US 8,548,242 B1, 10/2013, Longacre, Jr. (withdrawn)
(Continued)

*Primary Examiner* — Manuel L Barbee
(74) *Attorney, Agent, or Firm* — Robinson IP Law, PLLC

(57) ABSTRACT

A system and method for inspecting a railway track. The system preferably includes: a processor; at least one sensor oriented to capture data of the railway track; a data storage device in electronic communication with the processor; and computer executable instructions stored on a computer readable storage medium in communication with the processor operable to: determine an elevation of a surface of a rail head of a rail located on the railway track based on a distance to the rail head from the at least one sensor, determine an elevation of a surface of a crosstie of the railway track based on a distance to a top surface of the crosstie from the at least one sensor, estimate a total rail height and underlying rail support, and calculate a crosstie wear value based on the determined rail head surface elevation, crosstie surface elevation, and estimated total rail height and underlying rail support.

16 Claims, 25 Drawing Sheets

(51) Int. Cl.
 *G01S 17/88* (2006.01)
 *G01S 19/13* (2010.01)

(56) References Cited

U.S. PATENT DOCUMENTS

| | | |
|---|---|---|
| 4,040,738 A | 8/1977 | Wagner |
| 4,198,164 A | 4/1980 | Cantor |
| 4,265,545 A | 5/1981 | Slaker |
| 4,330,775 A | 5/1982 | Iwamoto et al. |
| 4,490,038 A | 12/1984 | Theurer et al. |
| 4,531,837 A | 7/1985 | Panetti |
| 4,554,624 A | 11/1985 | Wickham et al. |
| 4,600,012 A | 7/1986 | Kohayakawa et al. |
| 4,653,316 A | 3/1987 | Fukuhara |
| 4,676,642 A | 6/1987 | French |
| 4,691,565 A | 9/1987 | Theurer |
| 4,700,223 A | 10/1987 | Shoutaro et al. |
| 4,731,853 A | 3/1988 | Hata |
| 4,775,238 A | 10/1988 | Weber |
| 4,781,060 A | 11/1988 | Berndt |
| 4,899,296 A | 2/1990 | Khattak |
| 4,900,153 A | 2/1990 | Weber et al. |
| 4,915,504 A | 4/1990 | Thurston |
| 4,974,168 A | 11/1990 | Marx |
| 5,199,176 A | 4/1993 | Theurer et al. |
| 5,203,089 A | 4/1993 | Trefouel et al. |
| 5,221,044 A | 6/1993 | Guins |
| 5,245,855 A | 9/1993 | Burgel et al. |
| 5,247,338 A | 9/1993 | Danneskiold-Samsoe et al. |
| 5,353,512 A | 10/1994 | Theurer et al. |
| 5,433,111 A | 7/1995 | Hershey et al. |
| 5,487,341 A | 1/1996 | Newman |
| 5,493,499 A | 2/1996 | Theurer et al. |
| 5,612,538 A | 3/1997 | Hackel et al. |
| 5,623,244 A | 4/1997 | Cooper |
| 5,627,508 A | 5/1997 | Cooper et al. |
| 5,671,679 A | 9/1997 | Straub et al. |
| 5,721,685 A | 2/1998 | Holland et al. |
| 5,743,495 A | 4/1998 | Welles |
| 5,744,815 A | 4/1998 | Gurevich et al. |
| 5,757,472 A | 5/1998 | Wangler et al. |
| 5,786,750 A | 7/1998 | Cooper |
| 5,787,815 A | 8/1998 | Andersson et al. |
| 5,791,063 A | 8/1998 | Kesler et al. |
| 5,793,491 A | 8/1998 | Wangler et al. |
| 5,793,492 A | 8/1998 | Vanaki |
| 5,804,731 A | 9/1998 | Jaeggi |
| 5,808,906 A | 9/1998 | Sanchez-Revuelta et al. |
| 5,912,451 A | 6/1999 | Gurevich et al. |
| 5,969,323 A | 10/1999 | Gurevich |
| 5,970,438 A | 10/1999 | Clark et al. |
| 6,025,920 A | 2/2000 | Dec |
| 6,055,322 A | 4/2000 | Salganicoff |
| 6,055,862 A | 5/2000 | Martens |
| 6,062,476 A | 5/2000 | Stern et al. |
| 6,064,428 A | 5/2000 | Trosino et al. |
| 6,069,967 A | 5/2000 | Rozmus et al. |
| 6,128,558 A | 10/2000 | Kernwein |
| 6,243,657 B1 | 6/2001 | Tuck et al. |
| 6,252,977 B1 | 6/2001 | Salganicoff |
| 6,324,912 B1 | 12/2001 | Wooh |
| 6,347,265 B1 | 2/2002 | Bidaud |
| 6,356,299 B1 | 3/2002 | Trosino et al. |
| 6,357,297 B1 | 3/2002 | Makino et al. |
| 6,405,141 B1 | 6/2002 | Carr et al. |
| 6,416,020 B1 | 7/2002 | Gronskov |
| 6,496,254 B2 | 12/2002 | Bostrom et al. |
| 6,523,411 B1 | 2/2003 | Mian et al. |
| 6,540,180 B2 | 4/2003 | Anderson |
| 6,570,497 B2 | 5/2003 | Puckette, IV |
| 6,600,999 B2 | 7/2003 | Clark et al. |
| 6,615,648 B1 | 9/2003 | Ferguson et al. |
| 6,647,891 B2 | 11/2003 | Holmes et al. |
| 6,681,160 B2 | 1/2004 | Bidaud |
| 6,698,279 B1 | 3/2004 | Stevenson |
| 6,715,354 B2 | 4/2004 | Wooh |
| 6,768,551 B2 | 7/2004 | Mian et al. |
| 6,768,959 B2 | 7/2004 | Ignagni |
| 6,804,621 B1 | 10/2004 | Pedanckar |
| 6,854,333 B2 | 2/2005 | Wooh |
| 6,862,936 B2 | 3/2005 | Kenderian et al. |
| 6,873,998 B1 | 3/2005 | Dorum |
| 6,909,514 B2 | 6/2005 | Nayebi |
| 7,023,539 B2 | 4/2006 | Kowalski |
| 7,034,272 B1 | 4/2006 | Leonard |
| 7,036,232 B2 | 5/2006 | Casagrande |
| 7,054,762 B2 | 5/2006 | Pagano et al. |
| 7,084,989 B2 | 8/2006 | Johannesson et al. |
| 7,130,753 B2 | 10/2006 | Pedanekar |
| 7,164,476 B2 | 1/2007 | Shima et al. |
| 7,208,733 B2 | 4/2007 | Mian et al. |
| 7,213,789 B1 | 5/2007 | Matzan |
| 7,298,548 B2 | 11/2007 | Mian |
| 7,355,508 B2 | 4/2008 | Mian et al. |
| 7,357,326 B2 | 4/2008 | Hattersley et al. |
| 7,392,117 B1 | 6/2008 | Bilodeau et al. |
| 7,392,595 B2 | 7/2008 | Heimann |
| 7,403,296 B2 | 7/2008 | Farritor et al. |
| 7,412,899 B2 | 8/2008 | Mian et al. |
| 7,463,348 B2 | 12/2008 | Chung |
| 7,499,186 B2 | 3/2009 | Waisanen |
| 7,502,670 B2 | 3/2009 | Harrison |
| 7,516,662 B2 | 4/2009 | Nielsen et al. |
| 7,555,954 B2 | 7/2009 | Pagano et al. |
| 7,564,569 B2 | 7/2009 | Mian et al. |
| 7,602,937 B2 | 10/2009 | Mian et al. |
| 7,616,329 B2 | 11/2009 | Villar et al. |
| 7,659,972 B2 | 2/2010 | Magnus et al. |
| 7,680,631 B2 | 3/2010 | Selig et al. |
| 7,681,468 B2 | 3/2010 | Verl et al. |
| 7,698,028 B1 | 4/2010 | Bilodeau et al. |
| 7,755,660 B2 | 7/2010 | Nejikovsky et al. |
| 7,755,774 B2 | 7/2010 | Farritor et al. |
| 7,832,281 B2 | 11/2010 | Mian et al. |
| 7,869,909 B2 | 1/2011 | Harrison |
| 7,882,742 B1 | 2/2011 | Martens |
| 7,899,207 B2 | 3/2011 | Mian et al. |
| 8,006,559 B2 | 8/2011 | Mian et al. |
| 8,079,274 B2 | 12/2011 | Mian et al. |
| 8,081,320 B2 | 12/2011 | Villar et al. |
| 8,111,387 B2 | 2/2012 | Douglas et al. |
| 8,140,250 B2 | 3/2012 | Mian et al. |
| 8,150,105 B2 | 4/2012 | Mian et al. |
| 8,155,809 B1 | 4/2012 | Bilodeau et al. |
| 8,180,590 B2 | 5/2012 | Szwilski et al. |
| 8,188,430 B2 | 5/2012 | Mian |
| 8,190,377 B2 | 5/2012 | Fu |
| 8,209,145 B2 | 6/2012 | Paglinco et al. |
| 8,263,953 B2 | 9/2012 | Fomenkar et al. |
| 8,289,526 B2 | 10/2012 | Kilian et al. |
| 8,326,582 B2 | 12/2012 | Mian et al. |
| 8,335,606 B2 | 12/2012 | Mian et al. |
| 8,345,948 B2 | 1/2013 | Zarembski et al. |
| 8,345,099 B2 | 2/2013 | Bloom et al. |
| 8,365,604 B2 | 2/2013 | Kahn |
| 8,405,837 B2 | 3/2013 | Nagle, II et al. |
| 8,412,393 B2 | 4/2013 | Anderson |
| 8,418,563 B2 | 4/2013 | Wigh et al. |
| 8,423,240 B2 | 4/2013 | Mian |
| 8,424,387 B2 | 4/2013 | Wigh et al. |
| 8,478,480 B2 | 7/2013 | Mian et al. |
| 8,485,035 B2 | 7/2013 | Wigh et al. |
| 8,490,887 B2 | 7/2013 | Jones |
| 8,514,387 B2 | 8/2013 | Scherf et al. |
| 8,625,878 B2 | 1/2014 | Haas et al. |
| 8,649,932 B2 | 2/2014 | Mian et al. |
| 8,655,540 B2 | 2/2014 | Mian et al. |
| 8,682,077 B1 | 3/2014 | Longacre, Jr. |
| 8,700,924 B2 | 4/2014 | Mian et al. |
| 8,711,222 B2 | 4/2014 | Aaron et al. |
| 8,724,904 B2 | 5/2014 | Fujiki |
| 8,806,948 B2 | 8/2014 | Kahn et al. |
| 8,818,585 B2 | 8/2014 | Bartonek |
| 8,820,166 B2 | 9/2014 | Wigh et al. |

(56) References Cited

U.S. PATENT DOCUMENTS

| | | |
|---|---|---|
| 8,868,291 B2 | 10/2014 | Mian et al. |
| 8,903,574 B2 | 12/2014 | Cooper et al. |
| 8,925,873 B2 | 1/2015 | Gamache et al. |
| 8,934,007 B2 | 1/2015 | Snead |
| 8,942,426 B2 | 1/2015 | Bar-am |
| 8,958,079 B2 | 2/2015 | Kainer et al. |
| 9,036,025 B2 | 5/2015 | Haas et al. |
| 9,049,433 B1 | 6/2015 | Prince |
| 9,050,984 B2 | 6/2015 | Li et al. |
| 9,121,747 B2 | 9/2015 | Mian et al. |
| 9,134,185 B2 | 9/2015 | Mian et al. |
| 9,175,998 B2 | 11/2015 | Turner et al. |
| 9,177,210 B2 | 11/2015 | King |
| 9,187,104 B2 | 11/2015 | Fang et al. |
| 9,195,907 B1 | 11/2015 | Longacre, Jr. |
| 9,205,849 B2 | 12/2015 | Cooper et al. |
| 9,205,850 B2 | 12/2015 | Shimada |
| 9,212,902 B2 | 12/2015 | Enomoto et al. |
| 9,222,904 B2 | 12/2015 | Harrison |
| 9,234,786 B2 | 1/2016 | Groll et al. |
| 9,255,913 B2 | 2/2016 | Kumar |
| 9,297,787 B2 | 3/2016 | Fisk |
| 9,310,340 B2 | 4/2016 | Mian et al. |
| 9,336,683 B2 | 5/2016 | Inomata et al. |
| 9,340,219 B2 | 5/2016 | Gamache et al. |
| 9,346,476 B2 | 5/2016 | Dargy et al. |
| 9,389,205 B2 | 7/2016 | Mian et al. |
| 9,415,784 B2 | 8/2016 | Bartonek et al. |
| 9,423,415 B2 | 8/2016 | Nanba et al. |
| 9,429,545 B2 | 8/2016 | Havira et al. |
| 9,441,956 B2 | 9/2016 | Kainer et al. |
| 9,446,776 B2 | 9/2016 | Cooper et al. |
| 9,454,816 B2 | 9/2016 | Mian et al. |
| 9,469,198 B2 | 10/2016 | Cooper et al. |
| 9,518,947 B2 | 12/2016 | Bartonek et al. |
| 9,533,698 B2 | 1/2017 | Warta |
| 9,562,878 B2 | 2/2017 | Graham et al. |
| 9,571,796 B2 | 2/2017 | Mian et al. |
| 9,575,007 B2 | 2/2017 | Rao et al. |
| 9,580,091 B2 | 2/2017 | Kraeling et al. |
| 9,581,998 B2 | 2/2017 | Cooper et al. |
| 9,607,446 B2 | 3/2017 | Cooper et al. |
| 9,618,335 B2 | 4/2017 | Mesher |
| 9,619,725 B2 | 4/2017 | King |
| 9,628,762 B2 | 4/2017 | Farritor |
| 9,664,567 B2 | 5/2017 | Sivathanu et al. |
| 9,671,358 B2 | 6/2017 | Cooper et al. |
| 9,689,760 B2 | 6/2017 | Lanza di Scalea et al. |
| 9,714,043 B2 | 7/2017 | Mian et al. |
| 9,752,993 B1 | 9/2017 | Thompson et al. |
| 9,771,090 B2 | 9/2017 | Warta |
| 9,796,400 B2 | 10/2017 | Puttagunta et al. |
| 9,810,533 B2 | 11/2017 | Fosburgh et al. |
| 9,825,662 B2 | 11/2017 | Mian et al. |
| 9,849,895 B2 | 12/2017 | Mesher |
| 9,860,962 B2 | 1/2018 | Mesher |
| 9,921,584 B2 | 3/2018 | Rao et al. |
| 9,922,416 B2 | 3/2018 | Mian et al. |
| 9,950,716 B2 | 4/2018 | English |
| 9,950,720 B2 | 4/2018 | Mesher |
| 9,981,671 B2 | 5/2018 | Fraser et al. |
| 9,981,675 B2 | 5/2018 | Cooper et al. |
| 9,983,593 B2 | 5/2018 | Cooper et al. |
| 9,989,498 B2 | 6/2018 | Lanza di Scalea et al. |
| 10,040,463 B2 | 8/2018 | Singh |
| 10,043,154 B2 | 8/2018 | King |
| 10,077,061 B2 | 9/2018 | Schmidt et al. |
| 10,081,376 B2 | 9/2018 | Singh |
| 10,086,857 B2 | 10/2018 | Puttagunta et al. |
| 10,167,003 B1 | 1/2019 | Bilodeau |
| 10,352,831 B2 | 7/2019 | Kondo et al. |
| 10,414,416 B2 | 9/2019 | Hampapur |
| 2001/0045495 A1 | 11/2001 | Olson et al. |
| 2002/0065610 A1 | 5/2002 | Clark et al. |
| 2002/0070283 A1 | 6/2002 | Young |
| 2002/0093487 A1 | 7/2002 | Rosenberg |
| 2002/0099507 A1 | 7/2002 | Clark et al. |
| 2002/0150278 A1 | 10/2002 | Wustefeld |
| 2002/0196456 A1 | 12/2002 | Komiya et al. |
| 2003/0059087 A1 | 3/2003 | Waslowski et al. |
| 2003/0062414 A1 | 4/2003 | Tsikos et al. |
| 2003/0072001 A1 | 4/2003 | Mian et al. |
| 2003/0075675 A1 | 4/2003 | Braune et al. |
| 2003/0140509 A1 | 7/2003 | Casagrande |
| 2003/0164053 A1 | 9/2003 | Ignagni |
| 2004/0021858 A1 | 2/2004 | Shima et al. |
| 2004/0088891 A1 | 5/2004 | Theurer |
| 2004/0122569 A1 | 6/2004 | Bidaud |
| 2004/0189452 A1 | 9/2004 | Li |
| 2004/0247157 A1 | 12/2004 | Lages |
| 2004/0263624 A1 | 12/2004 | Nejikovsky |
| 2005/0279240 A1 | 12/2005 | Pedanekar et al. |
| 2006/0017911 A1 | 1/2006 | Villar |
| 2006/0098843 A1 | 5/2006 | Chew |
| 2006/0171704 A1 | 8/2006 | Bingle |
| 2007/0136029 A1 | 6/2007 | Selig et al. |
| 2007/0150130 A1 | 6/2007 | Welles |
| 2007/0211145 A1 | 9/2007 | Kilian et al. |
| 2007/0265780 A1 | 11/2007 | Kesler et al. |
| 2008/0007724 A1 | 1/2008 | Chung |
| 2008/0177507 A1 | 7/2008 | Mian et al. |
| 2008/0212106 A1 | 9/2008 | Hoffmann |
| 2008/0298674 A1 | 12/2008 | Baker |
| 2008/0304065 A1 | 12/2008 | Hesser |
| 2008/0304083 A1 | 12/2008 | Farritor et al. |
| 2009/0040503 A1 | 2/2009 | Kilian |
| 2009/0073428 A1 | 3/2009 | Magnus |
| 2009/0196486 A1 | 8/2009 | Distante et al. |
| 2009/0273788 A1 | 11/2009 | Nagle et al. |
| 2009/0319197 A1* | 12/2009 | Villar ................ B61K 9/08 702/34 |
| 2010/0007551 A1 | 1/2010 | Pagliuco |
| 2010/0026551 A1 | 2/2010 | Szwilski |
| 2010/0289891 A1 | 11/2010 | Akiyama |
| 2011/0064273 A1 | 3/2011 | Zarembski et al. |
| 2011/0209549 A1 | 9/2011 | Kahn |
| 2012/0026352 A1 | 2/2012 | Natroshvilli et al. |
| 2012/0051643 A1 | 3/2012 | Ha et al. |
| 2012/0062731 A1 | 3/2012 | Enomoto et al. |
| 2012/0192756 A1 | 8/2012 | Miller et al. |
| 2012/0218868 A1 | 8/2012 | Kahn et al. |
| 2012/0245908 A1 | 9/2012 | Berggren |
| 2012/0263342 A1 | 10/2012 | Haas |
| 2012/0300060 A1 | 11/2012 | Farritor |
| 2013/0070083 A1 | 3/2013 | Snead |
| 2013/0096739 A1 | 4/2013 | Landes et al. |
| 2013/0170709 A1 | 7/2013 | Distante et al. |
| 2013/0191070 A1* | 7/2013 | Kainer ................ B61K 9/08 702/167 |
| 2013/0313372 A1 | 11/2013 | Gamache et al. |
| 2013/0317676 A1 | 11/2013 | Cooper et al. |
| 2014/0129154 A1* | 5/2014 | Cooper ................ B61L 3/121 702/34 |
| 2014/0142868 A1 | 5/2014 | Bidaud |
| 2014/0151512 A1 | 6/2014 | Cooper |
| 2014/0177656 A1 | 6/2014 | Mian et al. |
| 2014/0333771 A1 | 11/2014 | Mian et al. |
| 2014/0339374 A1 | 11/2014 | Mian et al. |
| 2015/0131108 A1 | 5/2015 | Kainer et al. |
| 2015/0219487 A1 | 8/2015 | Maraini |
| 2015/0225002 A1 | 8/2015 | Branka et al. |
| 2015/0268172 A1 | 9/2015 | Naithani et al. |
| 2015/0269722 A1 | 9/2015 | Naithani et al. |
| 2015/0284912 A1 | 10/2015 | Delmonic et al. |
| 2015/0285688 A1 | 10/2015 | Naithani et al. |
| 2016/0002865 A1 | 1/2016 | English et al. |
| 2016/0039439 A1 | 2/2016 | Fahmy et al. |
| 2016/0059623 A1 | 3/2016 | Kilian |
| 2016/0121912 A1 | 5/2016 | Puttagunta et al. |
| 2016/0159381 A1 | 6/2016 | Fahmy |
| 2016/0207551 A1 | 7/2016 | Mesher |
| 2016/0209003 A1 | 7/2016 | Mesher |
| 2016/0212826 A1 | 7/2016 | Mesher |
| 2016/0249040 A1 | 8/2016 | Mesher |

(56) References Cited

U.S. PATENT DOCUMENTS

| | | |
|---|---|---|
| 2016/0282108 A1 | 9/2016 | Martinod Restrepo et al. |
| 2016/0304104 A1 | 10/2016 | Witte et al. |
| 2016/0305915 A1 | 10/2016 | Witte et al. |
| 2016/0312412 A1 | 10/2016 | Schrunk, III |
| 2016/0318530 A1 | 11/2016 | Johnson |
| 2016/0321513 A1 | 11/2016 | Mitti et al. |
| 2016/0325767 A1 | 11/2016 | LeFabvre et al. |
| 2016/0368510 A1 | 12/2016 | Simon et al. |
| 2017/0029001 A1 | 2/2017 | Berggren |
| 2017/0034892 A1 | 2/2017 | Mesher |
| 2017/0066459 A1 | 3/2017 | Singh |
| 2017/0106885 A1 | 4/2017 | Singh |
| 2017/0106887 A1 | 4/2017 | Mian et al. |
| 2017/0203775 A1 | 7/2017 | Mesher |
| 2017/0205379 A1 | 7/2017 | Prince et al. |
| 2017/0267264 A1 | 9/2017 | English et al. |
| 2017/0305442 A1 | 10/2017 | Viviani |
| 2017/0313332 A1 | 11/2017 | Paget et al. |
| 2017/0336293 A1 | 11/2017 | Kondo et al. |
| 2018/0038957 A1 | 2/2018 | Kawazoe et al. |
| 2018/0039842 A1 | 2/2018 | Schuchmann et al. |
| 2018/0057030 A1 | 3/2018 | Puttagunta et al. |
| 2018/0079433 A1 | 3/2018 | Mesher |
| 2018/0079434 A1 | 3/2018 | Mesher |
| 2018/0106000 A1 | 4/2018 | Fruehwirt |
| 2018/0127006 A1 | 5/2018 | Wade |
| 2018/0220512 A1 | 8/2018 | Mesher |
| 2018/0222504 A1 | 8/2018 | Birch et al. |
| 2018/0276494 A1 | 9/2018 | Fernandez |
| 2018/0281829 A1 | 10/2018 | Euston et al. |
| 2018/0339720 A1 | 11/2018 | Singh |
| 2019/0039633 A1 | 2/2019 | Li |
| 2019/0135315 A1 | 5/2019 | Dargy et al. |

FOREIGN PATENT DOCUMENTS

| | | |
|---|---|---|
| CA | 2607634 A1 | 4/2008 |
| CA | 2574428 C | 10/2009 |
| CA | 2782341 A1 | 6/2011 |
| CA | 2844113 | 2/2013 |
| CA | 2986580 | 9/2014 |
| CA | 2867560 A1 | 4/2015 |
| CA | 2607634 C | 6/2015 |
| CA | 2945614 A1 | 10/2015 |
| CA | 2732971 | 1/2016 |
| CA | 2996128 | 3/2016 |
| CA | 2860073 | 5/2016 |
| CA | 2867560 C | 7/2017 |
| CN | 106291538 A | 1/2017 |
| CN | 106364503 A | 2/2017 |
| CN | 106373191 A | 2/2017 |
| CN | 106384190 A | 2/2017 |
| CN | 104535652 B | 6/2017 |
| CN | 107688024 A | 2/2018 |
| CN | 206984011 U | 2/2018 |
| CN | 108009484 A | 5/2018 |
| CN | 108657222 | 10/2018 |
| DE | 19831176 | 1/2000 |
| DE | 19831215 | 1/2000 |
| DE | 10040139 | 7/2002 |
| DE | 19826422 | 9/2002 |
| DE | 60015268 | 3/2005 |
| DE | 19943744 | 1/2006 |
| DE | 19919604 | 8/2009 |
| DE | 102012207427 | 7/2013 |
| DE | 102009018036 | 2/2014 |
| DE | 102014119056 | 6/2016 |
| EP | 0274081 | 7/1988 |
| EP | 1079322 | 2/2001 |
| EP | 1146353 | 10/2001 |
| EP | 1158460 | 11/2001 |
| EP | 1168269 | 1/2002 |
| EP | 1197417 A1 | 4/2002 |
| EP | 1098803 | 1/2003 |
| EP | 1600351 | 1/2007 |
| EP | 1892503 | 7/2007 |
| EP | 1918702 A2 | 5/2008 |
| EP | 1964026 | 9/2008 |
| EP | 1992167 | 5/2016 |
| EP | 3024123 | 5/2016 |
| EP | 2806065 | 9/2016 |
| EP | 3138753 A1 | 3/2017 |
| EP | 3138754 A1 | 3/2017 |
| EP | 2697738 | 8/2017 |
| EP | 2697738 B1 | 8/2017 |
| EP | 2998927 | 9/2018 |
| FR | 2674809 | 10/1992 |
| FR | 3049255 A1 | 9/2017 |
| FR | 3077553 | 2/2018 |
| FR | 3049255 B1 | 4/2018 |
| FR | 3077553 | 8/2019 |
| GB | 2265779 | 10/1993 |
| GB | 2378344 | 2/2003 |
| GB | 2383635 B | 6/2005 |
| GB | 2536746 | 9/2016 |
| GB | 2536746 B | 3/2017 |
| JP | 60039555 | 3/1985 |
| JP | 63302314 | 12/1988 |
| JP | 6011316 | 1/1994 |
| JP | 06322707 | 11/1994 |
| JP | H07146131 | 6/1995 |
| JP | 7280532 | 10/1995 |
| JP | H07294443 | 11/1995 |
| JP | H07294444 | 11/1995 |
| JP | 10332324 | 12/1998 |
| JP | 11172606 | 6/1999 |
| JP | 2000221146 | 8/2000 |
| JP | 2000241360 | 9/2000 |
| JP | H0924828 | 7/2002 |
| JP | 2002294610 | 10/2002 |
| JP | 2003074004 | 3/2003 |
| JP | 2003121556 | 4/2003 |
| JP | 2004132881 | 4/2004 |
| JP | 2007240342 | 9/2007 |
| JP | 4008082 | 11/2007 |
| JP | 2010229642 A | 10/2010 |
| JP | 5283548 | 9/2013 |
| JP | 5812595 | 11/2015 |
| JP | 2015209205 | 11/2015 |
| JP | 2016191264 A | 11/2016 |
| JP | 6068012 B2 | 1/2017 |
| JP | 2017020862 A | 1/2017 |
| JP | 6192717 B2 | 9/2017 |
| JP | 6327413 B2 | 5/2018 |
| JP | 6425990 B2 | 11/2018 |
| JP | 2019065650 A | 4/2019 |
| JP | 6530979 B2 | 6/2019 |
| KR | 101562635 | 10/2015 |
| KR | 101706271 B1 | 2/2017 |
| KR | 1020180061929 A | 6/2018 |
| RU | 2142892 | 12/1999 |
| RU | 101851 | 1/2011 |
| SU | 1418105 | 8/1988 |
| WO | 2000/05576 A2 | 2/2000 |
| WO | 2000/08459 | 2/2000 |
| WO | 2000-73118 A1 | 12/2000 |
| WO | 2001/066401 A1 | 9/2001 |
| WO | 2001066401 | 5/2003 |
| WO | 2005/036199 A2 | 4/2005 |
| WO | 2005036199 | 4/2005 |
| WO | 2005098352 | 10/2005 |
| WO | 2006008292 | 1/2006 |
| WO | 2006014893 | 2/2006 |
| WO | 2011002534 | 1/2011 |
| WO | 2012142548 A1 | 10/2012 |
| WO | 2013146502 | 3/2013 |
| WO | 2013/177393 A1 | 11/2013 |
| WO | 2015160300 A1 | 10/2015 |
| WO | 2015/165560 A1 | 11/2015 |
| WO | 2016/008201 A1 | 1/2016 |
| WO | 2016/027072 A1 | 2/2016 |
| WO | 2016007393 A3 | 7/2016 |
| WO | 2016168576 | 10/2016 |
| WO | 2016168623 | 10/2016 |

(56) References Cited

FOREIGN PATENT DOCUMENTS

| WO | 2017159701 A1 | 9/2017 |
| --- | --- | --- |
| WO | 2018207469 | 11/2018 |
| WO | 2018208153 | 11/2018 |
| WO | 2019/023613 A1 | 1/2019 |
| WO | 2019/023658 A1 | 1/2019 |
| WO | 2019023613 | 1/2019 |
| WO | 2019023658 | 1/2019 |

OTHER PUBLICATIONS

Kantor, et al., "Automatic Railway Classification Using Surface and Subsurface Measurements" Proceedings of the 3rd International Conference on Field and Service Robitics, pp. 43-48 (2001).
Magnes, Daniel L., "Non-Contact Technology for Track Speed Rail Measurements (ORIAN)" SPIE vol. 2458, pp. 45-51 (1995).
Ryabichenko, et al. "CCD Photonic System for Rail Width Measurement" SPIE vol. 3901, pp. 37-44 (1999).
Gingras, Dennis, "Optics and Photonics Used in Road Transportation" (1998).
Liviu Bursanescu and François Blais, "Automated Pavement Distress Data Collection and Analysis: a 3-D Approach" (1997).
U.S. Patent and Trademark Office, Non-Final Office Action for U.S. Appl. No. 14/725,490 dated Feb. 23, 2018.
U.S. Patent and Trademark Office, Non-Final Office Action for U.S. Appl. No. 14/724,925 dated Feb. 26, 2016.
U.S. Patent and Trademark Office, Non-Final Office Action for U.S. Appl. No. 14/724,890 dated Jul. 29, 2016.
U.S. Patent and Trademark Office, Final Office Action for U.S. Appl. No. 14/724,890 dated Nov. 10, 2016.
U.S. Patent and Trademark Office, Non-Final Office Action for U.S. Appl. No. 14/724,890 dated Mar. 24, 2017.
Shawn Landers et al., "Development and Calibration of a Pavement Surface Performance Measure and Prediction Models for the British Columbia Pavement Management System" (2002).
Zheng Wu, "Hybrid Multi-Objective Optimization Models for Managing Pavement Assetts" (Jan. 25, 2008).
"Pavement Condition Index 101", OGRA's Milestones (Dec. 2009).
"Rail Radar Bringing the Track Into the Office" presentation given to CN Rail Engineering on Jan. 21, 2011.
Rail Radar, Inc. Industrial Research Assistance Program Application (IRAP) (Aug. 10, 2012).
"Rail Radar Automated Track Assessment" paper distributed at the Association of American Railways (AAR) Transportation Test Center in Oct. 2010 by Rail Radar, Inc.
U.S. Patent and Trademark Office, Non-Final Office Action for U.S. Appl. No. 14/725,490 dated Mar. 30, 2017.
U.S. Patent and Trademark Office, Final Office Action for U.S. Appl. No. 14/725,490 dated Aug. 16, 2017.
T. Kanade, ed., Three-Dimensional Machine Vision, Kluwer Academic Publishers (1987) [Part 1].
T. Kanade, ed., Three-Dimensional Machine Vision, Kluwer Academic Publishers (1987) [Part 2].
D.D. Davis et al., "Tie Condition Inspection a Case Study of Tie Failure Rate, Mods, and Clustering," Report No. R-714, Association of American Railroads Research and Test Department (Jul. 1989).
John Choros et al., "Prevention of Derailments due to Concrete Tie Rail Seat Deterioration," Proceedings of ASME/IEEE Joint Rail Conference & Internal Combustion Engine Spring Technical Conference. No. 40096 (2007).
Korean Intellectual Property Office, International Search Report for Int. App. No. PCT/IB2018/058574 dated Feb. 27, 2019.
Korean Intellectual Property Office, Written Opinion of the International Searching Authority for Int. App. No. PCT/IB2018/058574 dated Feb. 27, 2019.
U.S. Patent and Trademark Office, Non-Final Office Action for U.S. Appl. No. 16/127,956 dated Dec. 31, 2018.
D.D. Davis et al., "Tie Performance—A Progress Report of the Des Plaines Test Site," Report No. R-746, Association of American Railroads Research and Test Department (Apr. 1990).
Mattias Johanneson, "Architectures for Sheet-of-Light Range Imaging," Report No. LiTH-ISY-I-1335, Image Processing Group, Department of Electrical Engineering, Linköping University (Feb. 27, 1992).
U.S. Appl. No. 60/584,769, "System & Method for Inspecting Railroad Track" by John Nagle & Steven C. Orrell.
Mattias Johannesson, "Sheet-of-light Range Imaging," Linköping Studies in Science and Technology. Dissertations No. 399 (1995).
M. Johannesson, SIMD Architectures for Range and Radar Imaging, PhD thesis, University of Linköping (1995).
Erik Åstrand, "Automatic Inspection of Sawn Wood," Linköping Studies in Science and Technology. Dissertations. No. 424 (1996).
Mattias Johannesson, "Sheet-of-Light range imaging experiments with MAPP2200," Report No. LiTH-ISY-I-1401, Image Processing Group, Department of Electrical Engineering, Linköping University (Sep. 28, 1992).
M. de Bakker et al., "A Smart Range Image Sensor," Proceedings of the 24th European Solid-State Circuits Conference (1998):208-11;xii+514.
Dr. Mats Gokstorp et al., "Smart Vision Sensors," International Conference on Image Processing (Oct. 4-7, 1998), Institute of Electrical and Electronics Engineers, Inc.
Mattias Johanneson, et al., "An Image Sensor for Sheet-of-Light Range Imaging," IAPR Workshop on Machine Vision Applications (Dec. 7-9, 1992).
Mattias Johannesson, "Can Sorting using sheet-of-light range imaging and MAPP2200," Institute of Electrical and Electronics Engineers; International Conference on Systems, Man and Cybernetics (Oct. 17-20, 1993).
Michiel de Bakker, et al., "Smart PSD array for sheet-of-light range imaging," The International Society for Optical Engineering. Sensors and Camera Systems for Scientific, Industrial, and Digital Photography Applications (Jan. 24-26, 2000).
Umayal Chidambaram, "Edge Extraction of Color and Range Images," (Dec. 2003).
Franz Pernkopf et al., "Detection of surface defects on raw milled steel blocks using range imaging" The International Society for Optical Engineering. Machine Vision Applications in Industrial Inspection X (Jan. 21-22, 2002).
Murhed, Anders, "IVP Integrated Vision Products," Pulp and Paper International 44.12 (Dec. 1, 2002).
Anders Åstrand, "Smart Image Sensors," Linköping Studies in Science and Technology. Dissertations. No. 319 (1993).
Mattias Johannesson et al., "Five Contributions to the Art of Sheet-of-light Range Imaging on MAPP2200," Report No. LiTH-ISY-R-1611, Image Processing Group, Department of Electrical Engineering, Linköping University (Apr. 14, 1994).
Federal Register, vol. 73 (70695-70696).
Newman et al., "A Survey of Automated Visual Inspection," Computer Vision an Image Understanding vol. 61, No. 2, March, pp. 231-262, 1995.
J. Velten et al., "Application of a Brightness-Adapted Edge Detector for Real-Time Railroad Tie Detection in Video Images," Institute of Electrical and Electronics Engineers (1999).
R. Gordon Kennedy, "Problems of Cartographic Design in Geographic Information Systems for Transportation," Cartographic Perspectives (Jul. 20, 1999).
Richard Reiff, "An Evaluation of Remediation Techniques for Concrete Tie Rail Seat Abrasion in the Fast Environment," American Railway Engineering Association, Bulletin 753 (1995).
Russell H. Lutch et al., "Causes and Preventative Methods for Rail Seat Abrasion in North America's Railroads," Conference Paper (Oct. 2014).
Nigel Peters and Steven R. Mattson, "CN 60E Concrete Tie Development," AREMA: 25 (2003).
Federal Register, vol. 76, No. 175, pp. 55819-55825.
National Transportation Safety Board, "Railroad Accident Brief" (NTSB/RAB-06/03).
Arthur L. Clouse et al. "Track Inspection Into the 21st Century" (Sep. 19, 2006).
Federal Register, vol. 76, No. 63, pp. 18001-18346 (18073).
Railroad Safety Advisory Committee (RSAC), Minutes of Meeting, Dec. 10, 2008, Washington, D.C.

(56) References Cited

OTHER PUBLICATIONS

Dennis P. Curtin, "An Extension to the Textbook of Digital Photography, Pixels and Images" (2007).
Holland L.P.'s Combined Motion for Early Markman Claim Construction and Summary Judgment of Non-Infringement in *Georgetown Rail Equipment Company* v. *Holland L.P.*, (E.D. Tex.) (Tyler) (6:13-cv-366).
Georgetown Rail Equipment Company's Response to Holland L.P.'s Combined Motion for Early Markman Claim Construction and Summary Judgment of Non-Infringement in *Georgetown Rail Equipment Company* v. *Holland L.P.*, (E.D. Tex.) (Tyler) (6:13-cv-366).
Georgetown Rail Equipment Company's P.R. 4-5(a) Opening Markman Claim Construction Brief in *Georgetown Rail Equipment Company* v. *Holland L.P.*, (E.D. Tex.) (Tyler) (6:13-cv-366).
Holland L.P.'s Responsive Markman Claim Construction Brief Under P.R. 4-5 in *Georgetown Rail Equipment Company* v. *Holland L.P.*, (E.D. Tex.) (Tyler) (6:13-cv-366).
Claim Construction Memorandum Opinion and Order in *Georgetown Rail Equipment Company* v. *Holland L.P.*, (E.D. Tex) (Tyler) (6:13-cv-366).
Public Judgment and Reasons in *Georgetown Rail Equipment Company* v. *Rail Radar Inc. and Tetra Tech EBA Inc.* (T-896-15) (2018 FC 70).

\* cited by examiner

Prior Art

APPARATUS AND METHOD FOR CALCULATING WOODEN CROSSTIE PLATE CUT MEASUREMENTS AND RAIL SEAT ABRASION MEASUREMENTS BASED ON RAIL HEAD HEIGHT

CROSS-REFERENCE TO RELATED APPLICATION

This application is a nonprovisional application of and claims priority to U.S. Provisional Application Ser. No. 62/679,467 entitled "APPARATUS AND METHOD FOR CALCULATING WOODEN TIE PLATE CUT MEASUREMENTS AND RAIL SEAT ABRASION MEASUREMENTS" which was filed on Jun. 1, 2018, the entirety of which is incorporated herein by reference.

FIELD

This disclosure relates to the field of railway track inspection and assessment systems. More particularly, this disclosure relates to a railway track inspection and assessment system for calculating wooden tie plate cut measurements and rail seat abrasion measurements for concrete crossties based on the height of the rail head.

BACKGROUND

Tie plate damage to wooden crossties through crosstie surface abrasion is a significant form of distress negatively impacting crosstie condition by reducing rail fastener holding capabilities. Referring to FIG. 1, a typical rail assembly includes a rail 100 resting on top of a tie plate 102 (also referred to as a "rail plate" or "base plate") and a plurality of spikes 104 securing the tie plate 102 and rail 100 to a crosstie 106, such as a wooden crosstie. The amount that a base of the tie plate 102 (i.e., a tie plate base 108) has penetrated or cut into a surface of the underlying wooden crosstie 106 is due to repeatedly applied heavy loads from train traffic and is referred to as the level of "Plate Cut" (the amount the tie plate base 108 has cut or abraded into a surface of the crosstie 106).

The rail 100 includes a rail head 110 located at a top of the rail 100, a rail web 112, and a rail foot 114 located below the rail web 112 and the rail head 110. A bottom of the rail foot 114 is referred to as a rail base seat 116, and a top of the rail foot 114 is referred to as a rail base surface 118.

Employing current three-dimensional (3D) triangulation-based measurement technologies used for railway track assessment with 3D sensors positioned above the rail assembly, an elevation of the rail base seat 116, or the tie plate base 108 cannot be measured directly. Therefore, an elevation of the tie plate base 108 must be estimated by measuring an elevation of a top surface of the tie plate 102 (i.e., the tie plate surface 120) and subtracting an estimated thickness of the tie plate 102.

The plate cut value increases as the tie plate 102 cuts downward into an upper surface of the crosstie 106 to which the tie plate 102 is fastened (the tie plate base 108 penetrates or cuts into the upper crosstie surface 122). Conventional methods of determining plate cut value require calculating the difference between the surface elevation of outermost tie plate edges (on the "field" side outside of the rails and on the "gauge" side that is between the rails) and the adjacent upper crosstie surface 122 elevations near the edge of the tie plate 102. Referring to FIG. 2, a conventional plate cut measure is derived from the difference in elevation between tie plate surface 120 and the adjacent crosstie surface elevation (i.e., the upper crosstie surface 122). In situations where the tie plate and crosstie surface regions are not obscured, plate cut can be calculated as follows:

$$\text{Plate Cut} = \text{Crosstie Surface Elevation} - (\text{Plate Surface Elevation} - \text{Plate Thickness Estimate}) \quad \text{Equation 1:}$$

A plate cut value of 0 millimeters (mm) would represent an undamaged (new) crosstie surface, as shown in FIG. 2. Referring to FIG. 3, in contrast to a new crosstie, a plate cut value of 25 mm or greater would represent a significant amount of damage to the crosstie surface. In practice, it is common to have significant amounts of ballast 124 or other track debris obscuring the tie plate 102 surface for significant portions of a rail network, as illustrated in FIG. 4. The presence of any material on the tie plate surface 120 makes it difficult, if not impossible, to determine the plate surface elevation in debris occluded areas. Without the ability to determine elevations of the tie plate surface 120 (for either the field and gauge side), a plate cut value cannot be determined.

In addition to plate cut in wooden crossties, concrete crosstie surface abrasion is a significant form of distress which negatively impacts concrete crosstie condition. Referring to FIG. 5, rail assemblies may also be formed using a concrete crosstie 126. The rail 100 rests on top of a pad 128 located between a rail base seat 130 and an upper crosstie surface 132 of the concrete crosstie 126. A clip 134 secures the rail 100 to the concrete crosstie 126 and includes an insulator 136 located between the clip 134 and the rail 100. Rail seat abrasion reduces rail fastener downward force on a rail foot 138 of the rail 100, thereby reducing the capability of the clip 134 to secure the rail 100 to the concrete crosstie 126. The pad 128 placed under rail 100 protects the upper crosstie surface 132 from rail movements due to applied loads from train traffic and from rail movement due to rail thermal expansion and contraction. The pad 128 wears until the pad thickness is diminished to the point where the rail base seat 130 is able to contact the upper crosstie surface 132. The amount that the rail base seat has penetrated or abraded the underlying crosstie surface is referred to as the level of rail seat abrasion.

Employing 3D triangulation-based measurement technologies used for railway track assessment with sensors positioned above the track surface, the elevation of the rail base seat 130, or the rail pad thickness cannot be measured directly. Therefore, the rail base seat elevation must be estimated by measuring a rail base surface elevation 140 and subtracting an estimated rail base thickness.

As a rail base seat wears the underlying pad 128, the pad thickness is reduced to zero. At the point of a zero thickness pad, the rail seat abrasion is said to be 0 mm, representing the point at which the rail base seat 130 is beginning to contact the upper crosstie surface 132. As the rail base seat 130 continues to abrade and penetrate into the upper crosstie surface 132, the rail seat abrasion values increase.

The conventional method of determining the rail seat abrasion parameter requires calculating the difference between the rail base seat elevation (for the field and the gauge sides of the rail) and the adjacent crosstie surface field and gauge elevations near the rail base, as shown in FIGS. 6 and 7. The conventional method of calculating rail seat abrasion is based on the elevation difference between the rail base surface and the adjacent crosstie surface. In situations where the rail base and crosstie surface regions are not obscured, rail seat abrasion is calculated as follows:

Rail Seat Abrasion=Crosstie Surface Elevation−(Rail Base Surface Elevation−Rail Base Thickness Estimate)     Equation 2:

In practice, it is common to have significant amounts of ballast 124 or other track debris obscuring the rail base surface for substantial portions of a rail network, as illustrated in FIG. 8. The presence of any material on the rail base surface makes it difficult, if not impossible, to determine the rail base surface elevation in debris occluded areas. Without the ability to determine elevations of the rail base surface (for either the field or gauge side), a rail seat abrasion value cannot be determined.

What is needed, therefore, is a means to measure plate cut and rail seat abrasion values in all track conditions. The capability to determine elevations for all crosstie plates and rail base surfaces regardless of whether they are obscured by ballast or other debris would significantly improve the ability to report plate cut measures for all wooden crossties and rail seat abrasion measures for all concrete crossties in a rail owner's network.

SUMMARY

The above and other needs are met by a system for inspecting a railway track, the apparatus comprising a processor; at least one sensor oriented to capture data of the railway track, the at least one sensor in electronic communication with the processor; a data storage device in electronic communication with the processor; and computer executable instructions stored on a computer readable storage medium in communication with the processor. The computer executable instructions are operable to determine an elevation of a surface of a rail head of a rail located on the railway track based on a distance to the rail head from the at least one sensor; determine an elevation of a surface of a crosstie of the railway track based on a distance to a top surface of the crosstie from the at least one sensor; estimate a total rail height and underlying rail support height; and calculate a crosstie wear value based on the determined rail head surface elevation, crosstie surface elevation, and estimated total rail height of the rail and underlying rail support height of an underlying rail support. The underlying rail support can be, for example, a tie plate (for wooden crosstie applications) or a pad (for concrete crosstie applications).

Preferably, the system for inspecting a railway track described above is located on a rail vehicle and further includes an encoder electromechanically engaged with a wheel of the rail vehicle and in communication with the processor to provide location data of the rail vehicle. Preferably, the system also comprises a GPS antenna in communication with the processor for detecting a location of the system.

Preferably, the at least one sensor of the system for inspecting a railway track described above further comprises a light emitter and a camera in communication with the processor, wherein the camera captures a field of view of the railway track including reflected light from the light emitter to generate a three-dimensional elevation map of the railway track. Alternatively, the at least one sensor may comprise one or more time of flight sensors. In some embodiments, the at least one sensor may comprise one or more light emitters, one or more cameras, and one or more time of flight sensors.

In addition to the system described above, a method of determining wear of a railway track is also disclosed, such method comprising the steps of shining a beam of light along a railway track, interrogating a railway track using at least one sensor which forms part of a track assessment system housed on a rail vehicle; receiving data corresponding to the railway track based on the interrogation of the railway track using the at least one sensor; determining an elevation of a rail head of the railway track based on the received data; determining an elevation of a top surface of a rail crosstie of the railway track based on the received data; estimating a total rail height of the railway track and a height of an underlying rail support; and determining a crosstie wear value based on the elevation of the rail head, the elevation of the top surface of the crosstie, the estimated total rail height, and the estimated height of the underlying rail support.

In a preferred embodiment, the estimated height of the rail is based on one or more visual indicators displayed on the rail which are visually captured by the at least one sensor and compared by the processor to a database of rail markings used by the manufacturer of the rail.

In a preferred embodiment, the method described above further comprises the step of determining a geographic location of one or more railway track features corresponding to the data captured on the at least one sensor, wherein the estimated total rail height is based on the geographic location of the one or more railway track features.

In a preferred embodiment, the method described above further comprises the step of determining an estimated total rail height by using the processor to access a database which includes data which correlates specific geographic track locations to the identities of the specific types of rails placed at those geographic track locations.

In one embodiment (in which the underlying rail support comprises a crosstie plate), the step of estimating a total rail height of the railway track and a height of an underlying rail support further comprises estimating a thickness of the crosstie plate. This method may further include the step of estimating a thickness of the tie plate based on received data at a plurality of locations along a length of track, wherein the estimated tie plate thickness is based on a maximum distance from the top surface of the rail head to the top surface of the rail crosstie along the length of track.

In one embodiment of the method described above, the rail wear value is a plate cut value corresponding to an amount that the tie plate has cut into a top surface of the rail crosstie being interrogated.

In one embodiment (in which the rail crosstie is a concrete rail crosstie), the rail wear value is a rail seat abrasion value corresponding to an amount that a rail base seat has cut into a top surface of the concrete rail crosstie being interrogated. In a related embodiment, the underlying rail support comprises a pad and the rail crosstie being interrogated is a concrete crosstie.

In one embodiment (in which the underlying rail support comprises a pad separating a rail from a concrete crosstie), the method further comprises the step of estimating a thickness of the pad. This method may further include the step of estimating a thickness of the pad based on received data at a plurality of locations along a length of track, wherein the estimated pad thickness is based on a maximum distance from the top surface of the rail head to the top surface of the rail crosstie along the length of track.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

"Track", "Railway track", "track bed", "rail assembly", or "railway track bed" is defined herein to mean a section of railway including the rails, crossties (or "ties"), components holding the rails to the crossties, components holding the rails together, and ballast material.

A "processor" is defined herein to include a processing unit including, for example, one or more microprocessors, an application-specific instruction-set processor, a network processor, a vector processor, a scalar processor, or any combination thereof, or any other control logic apparatus now known or later developed that is capable of performing the tasks described herein, or any combination thereof.

The phrase "in communication with" means that two or more devices are in communication with one another physically (e.g., by wire) or indirectly (e.g., by wireless communication).

Embodiments of the present disclosure provide methods and apparatuses for determining plate cut and rail seat abrasion values without requiring the upper surface of a crosstie plate for wooden crossties or rail base for concrete crossties to be visible to sensors located in proximity of a rail assembly. Methods described herein enable determination of plate cut and rail seat abrasion values when all or portions of the rail assembly are obscured by ballast or other debris, and only require that a top of the rail head and a portion of an underlying crosstie surface to be visible to sensors passing overhead.

Figure 9:
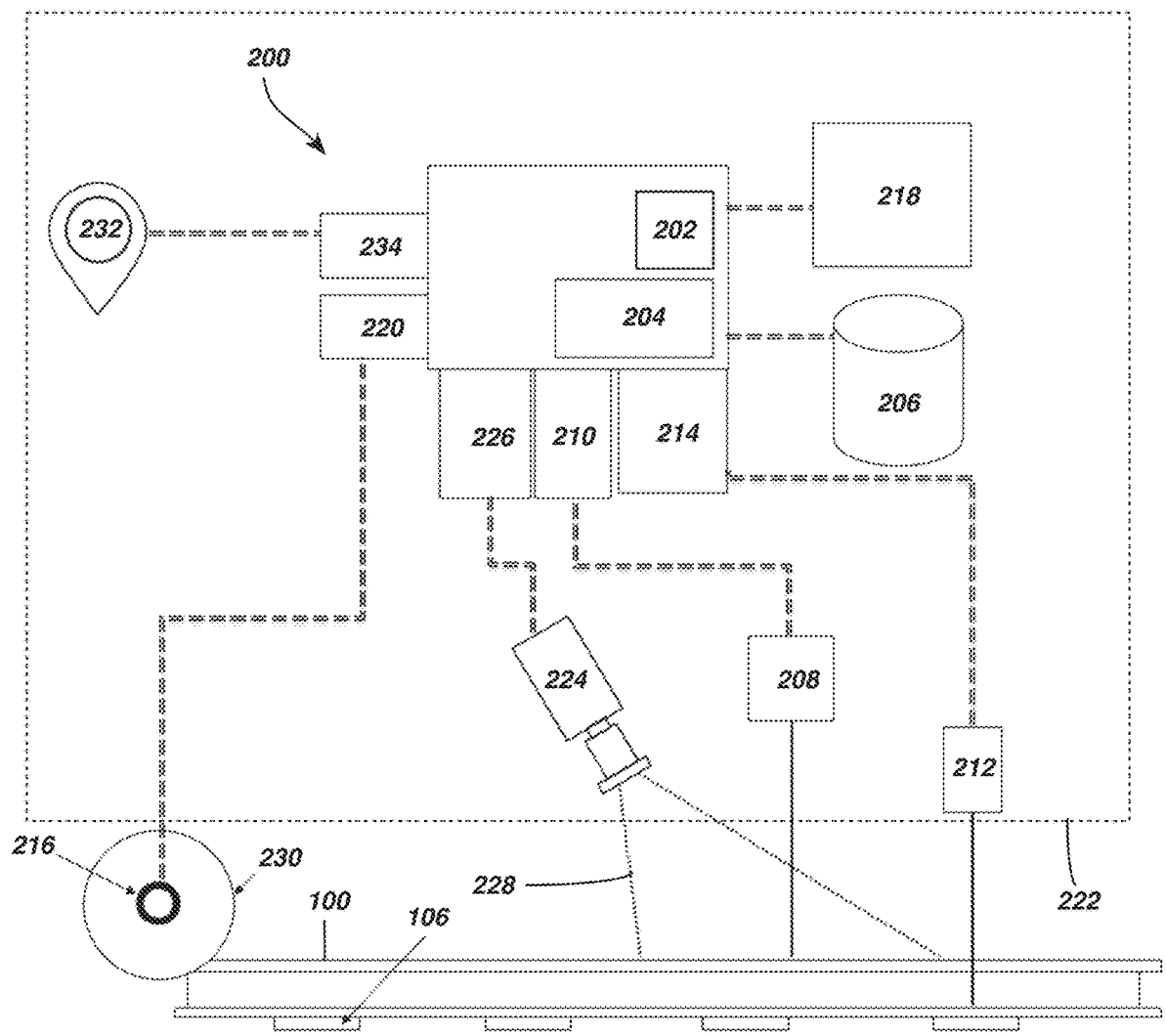
FIG. 9 shows a track assessment system according to one embodiment of the present disclosure.

As shown in FIG. 9, methods and apparatuses for calculating plate cut and rail seat abrasion values may be performed using a track assessment system 200 preferably including a processor 202, an onboard computer readable storage medium 204, a data storage device 206 in communication with the processor 202, computer executable instructions stored on one of the onboard computer readable storage medium 204 or the data storage device 206, optionally one or more light emitters 208 (e.g., a laser line emitter) via an optional light emitter interface 210, one or more sensors 212 in communication with the processor 202 via a sensor interface 214, and an optional encoder 216 in communication with the processor 202 via an optional encoder interface 220. In a preferred embodiment, the one or more sensors 212 are Time of Flight ("ToF") sensors. However, it is also understood that various other suitable sensors including three-dimensional or "3D" sensors 212 may be used. The track assessment system 200 further preferably includes a display and user interface 218 in communication with the processor 202 to display data to or receive input from an operator. The track assessment system 200 is preferably mounted on a rail vehicle 222, such as a rail car, locomotive, high-rail vehicle, or other railway vehicle. The track assessment system 200 may be powered by the rail vehicle 222 or may be powered by a battery or other local power source. The data storage device 206 may be onboard the vehicle 222 or may be remote from the vehicle, communicating wirelessly with the processor 202. The track assessment system 200 preferably includes the 3D Track Assessment System 223 or "3DTAS" available from Tetra Tech, Inc. and described in U.S. Patent Application Publication Number 2016/0249040 dated Aug. 25, 2016 entitled "3D Track Assessment System and Method," the contents of which are incorporated herein by reference in their entirety. An embodiment of the 3DTAS 223 including its basic components is shown in FIG. 10.

For embodiments employing one or more light emitters 208, such light emitters 208 are used to project a light, preferably a laser line, onto a surface of an underlying rail assembly to use in association with three-dimensional sensors to three-dimensionally triangulate the rail assembly. In a preferred embodiment, a camera 224 in communication with the processor 202 via a camera interface 226 is oriented such that a field of view 228 of the camera 224 captures the rail assembly including the light projected from the light emitter 208. The camera 224 may include a combination of lenses and filters and using known techniques of three-dimensional triangulation a three-dimensional elevation map of an underlying railway track bed can be generated by the processor 202 after vectors of elevations are gathered by the camera 224 as the rail vehicle 222 moves along the rail. Elevation maps generated based on the gathered elevation and intensity data can be interrogated by the processor 202 or other processing device using machine vision algorithms. Suitable cameras and sensors may include commercially available three-dimensional sensors and cameras, such as three-dimensional cameras manufactured by SICK AG based in Waldkirch, Germany.

ToF sensors are preferably based on pulsed laser light or LiDAR technologies. Such technologies determine the distance between the sensor and a measured surface by calculating an amount of time required for a light pulse to propagate from an emitting device, reflect from a point on the surface to be measured, and return back to a detecting device. The ToF sensors may be a single-point measurement device or may be an array measurement device, commonly referred to as a ToF camera, such as those manufactured by Basler AG or pmdtechnologies AG.

Figure 10:
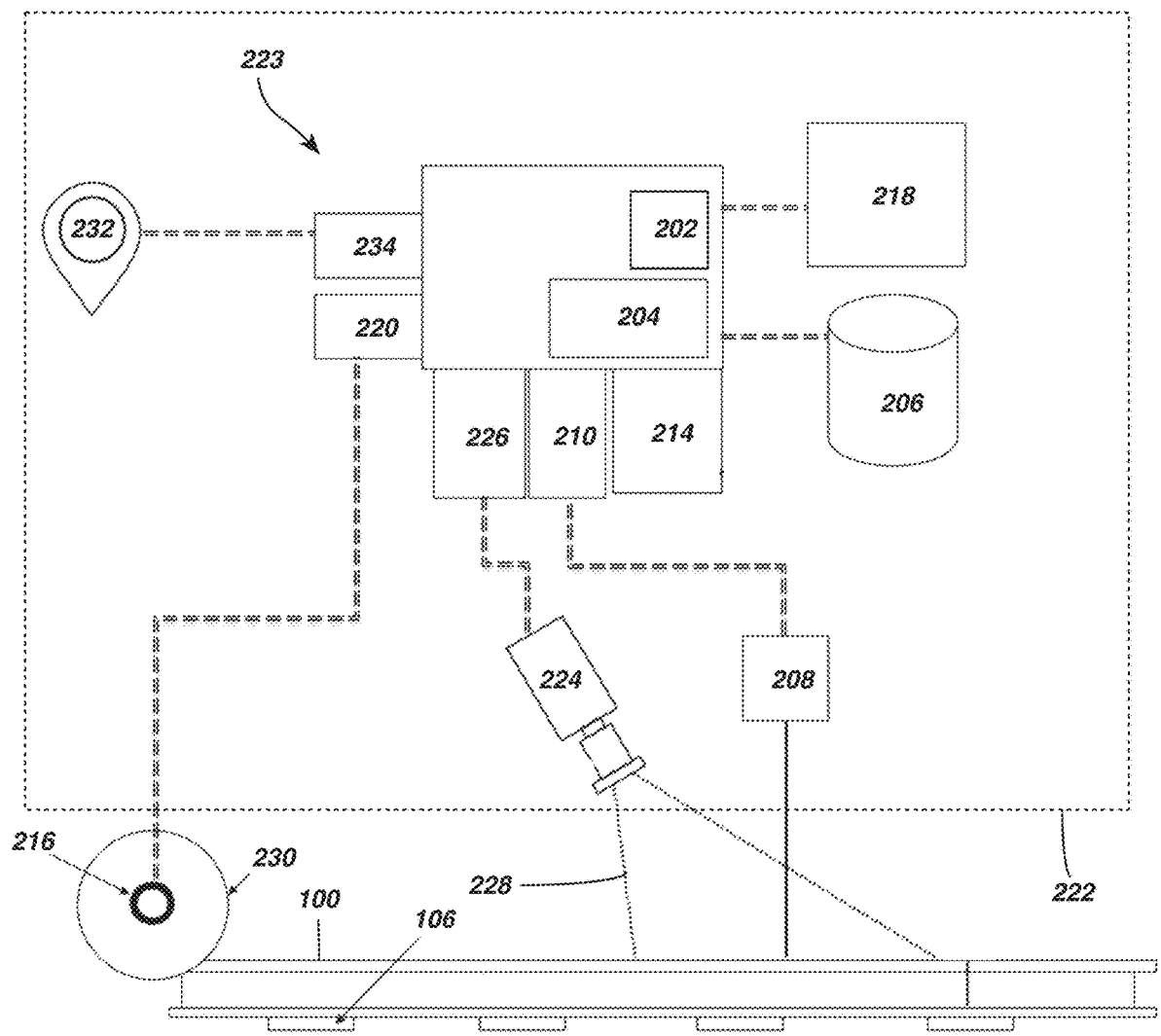
FIG. 10 shows an alternative arrangement of a track assessment system according to one embodiment of the present disclosure.
Figure 11:
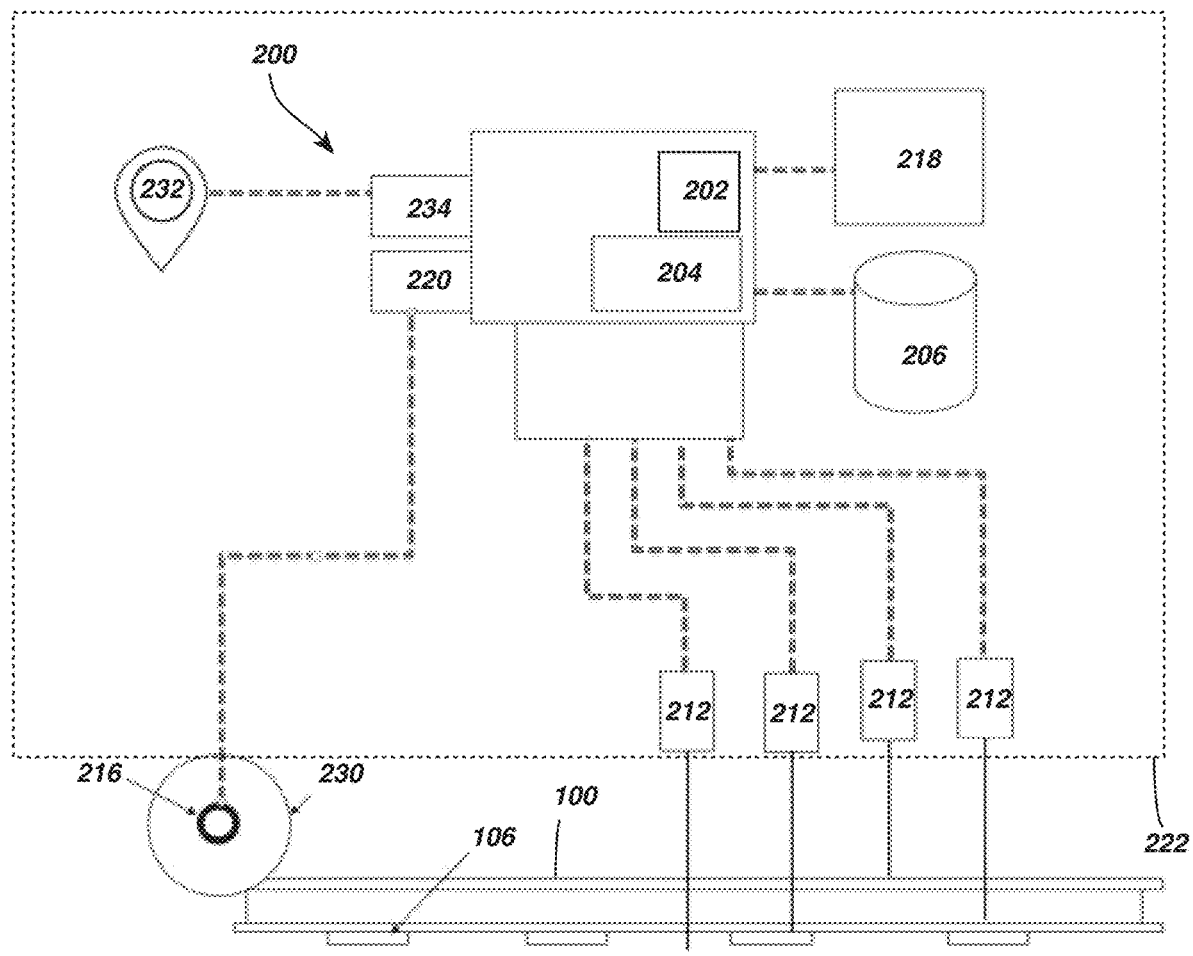
FIG. 11 shows another alternative arrangement of a track assessment system according to one embodiment of the present disclosure.
Figure 12:
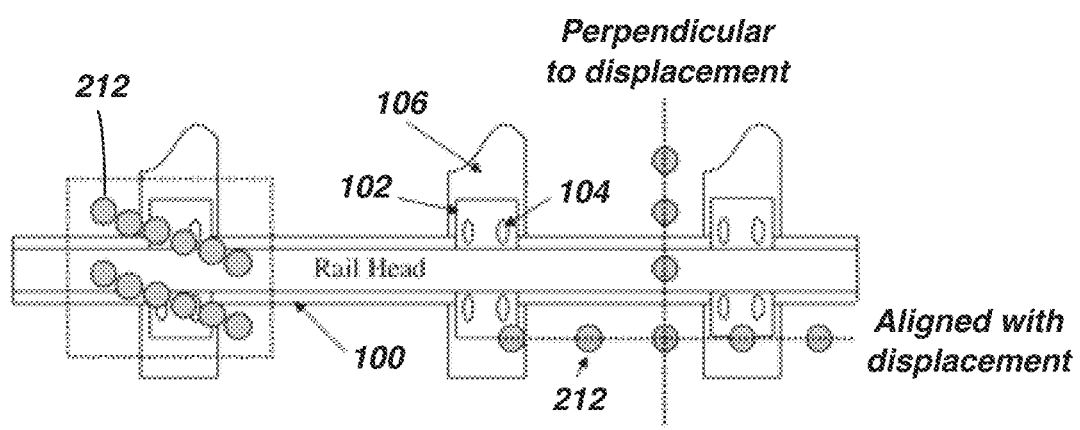
FIG. 12 shows placement of sensors of a track assessment system above a rail according to one embodiment of the present disclosure.

Referring to FIG. 10, three-dimensional mapping of a rail assembly may be performed by the track assessment system 200 using only the camera 224 and one or more light emitters 208. Alternatively, and as shown in FIG. 11, three-dimensional mapping may be performed using only sensors 212 comprising ToF sensors. A plurality of ToF sensors may be used such that various patterns and areas of an underlying rail assembly may be captured by the sensors 212. Referring to FIG. 12, the one or more sensors 212 may be arranged in varying patterns such that a measurement area is captured by the one or more sensors 212. The one or more sensors may be aligned perpendicular to the direction of travel (along the rails) or arranged in two or more directions to optimize a resolution of data acquired from the measurement area.

Referring again to FIG. 9, the camera interface 226 and sensor interface 214 receive signals from the camera 224 and sensors 212 respectively and convert the received signals into data that is compatible with the processor 202 and computer readable storage medium 204. The camera interface 226 and sensor interface 214 may further provide power to the camera 224 and sensors 212 and allow the processor 202 to communicate with the camera 224 and sensors 212, such as to communicate specific actions and settings such as acquisition rate, calibration parameters, and start/stop signals.

In a preferred embodiment, data from the camera 224 and one or more sensors 212 is combined, and a calibration process is preferably performed between the camera 224 and one or more sensors 212 using a known dimensional calibration target such that the camera 224 and one or more sensors 212 combine to generate a 3D elevation map as described in greater detail below.

The encoder 216 is located at a wheel 230 of the rail vehicle 222 and is in communication with the processor 202 via the encoder interface 220. The encoder 216 preferably operates at a rate of at least 12,500 pulses per revolution of the wheel 230 with a longitudinal distance of approximately 0.25 mm per pulse. Measurements from sensors 212 of the track assessment system are preferably synchronized with data from the encoder 216 to determine locations of measurements of the track assessment system and a generated three-dimensional elevation map. In one embodiment, the track assessment system further includes a GPS antenna 232 in communication with the processor 202 via a GPS interface 234 to further provide geo-position synchronization data during measurement of a rail assembly.

Figure 4:
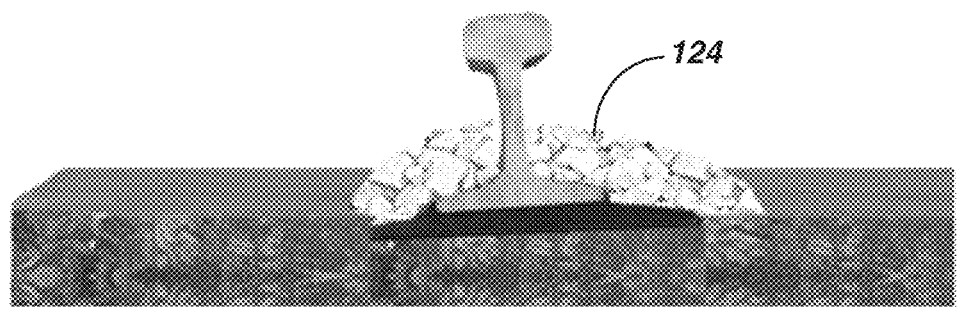
FIG. 4 shows a wooden crosstie rail assembly at least partially obscured by ballast according to one embodiment of the present disclosure.
Figure 5:
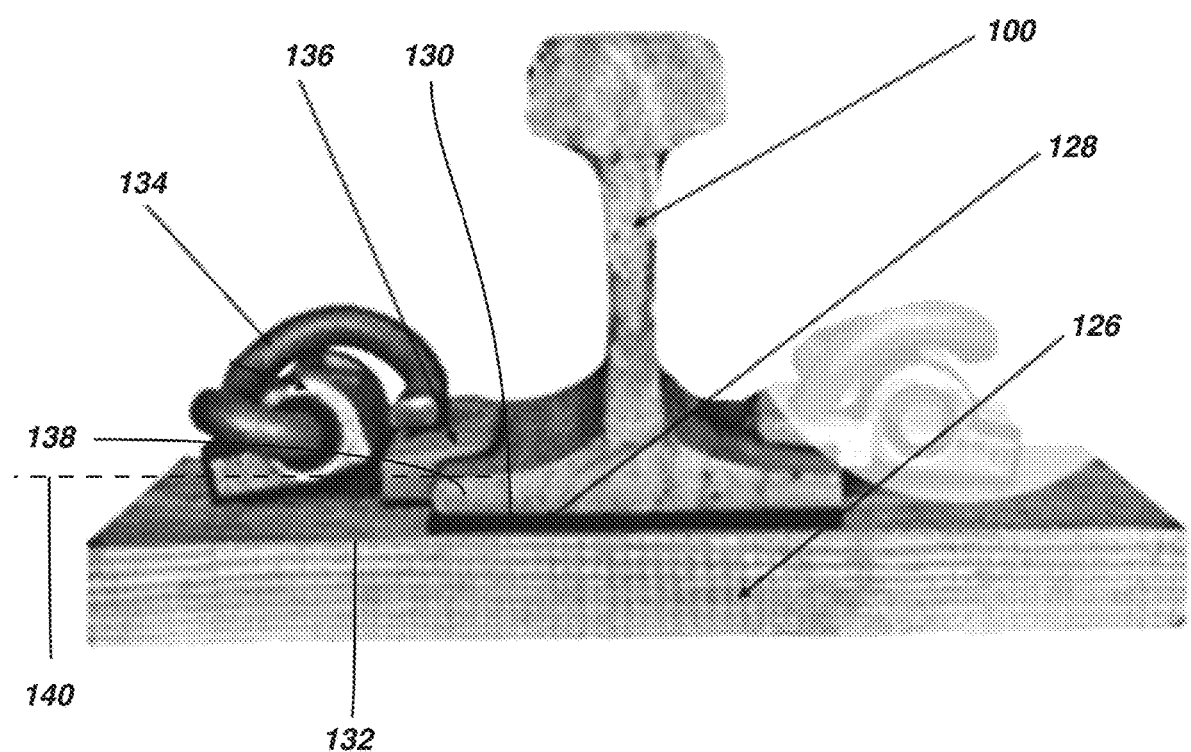
FIG. 5 shows a concrete crosstie rail assembly according to one embodiment of the present disclosure.
Figure 6:
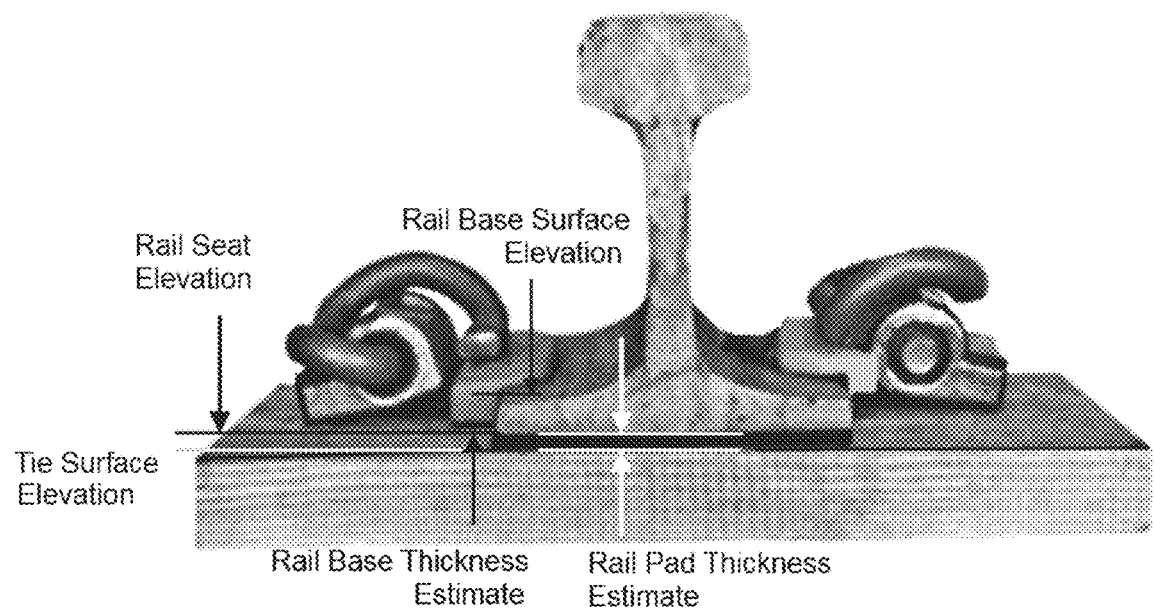
FIGS. 6 and 7 show prior methods of determining rail seat abrasion according to one embodiment of the present disclosure.
Figure 7:
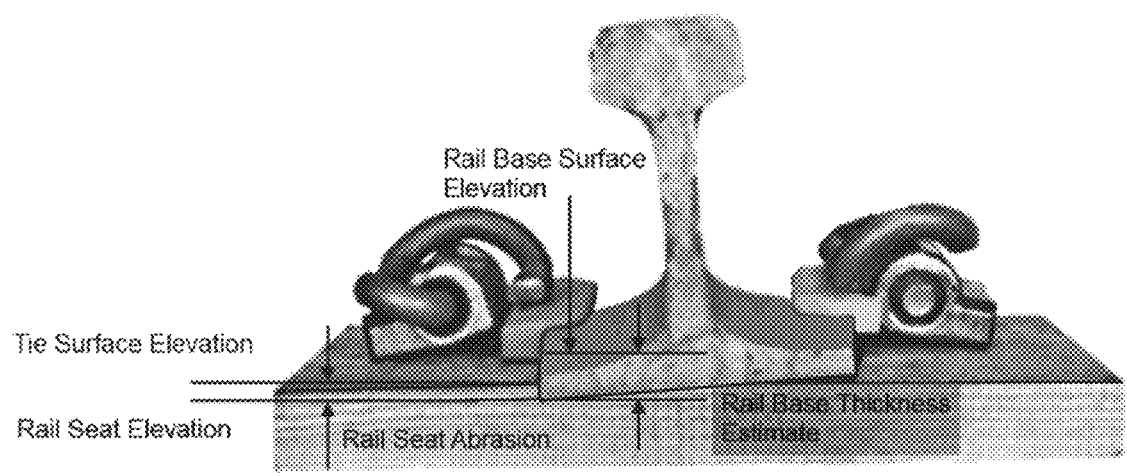
Figure 8:
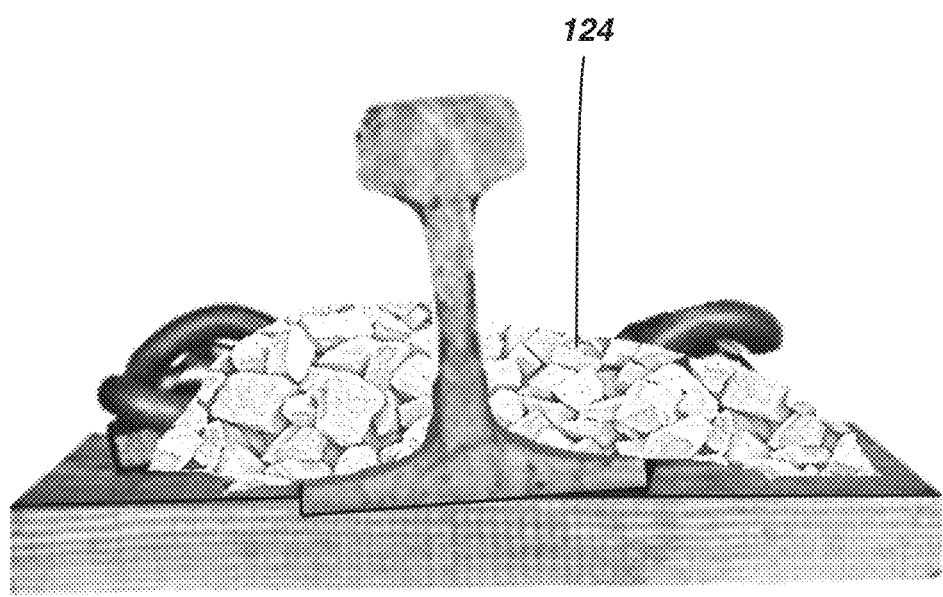
FIG. 8 shows a concrete crosstie rail assembly at least partially obscured by ballast according to one embodiment of the present disclosure.
Figure 13:
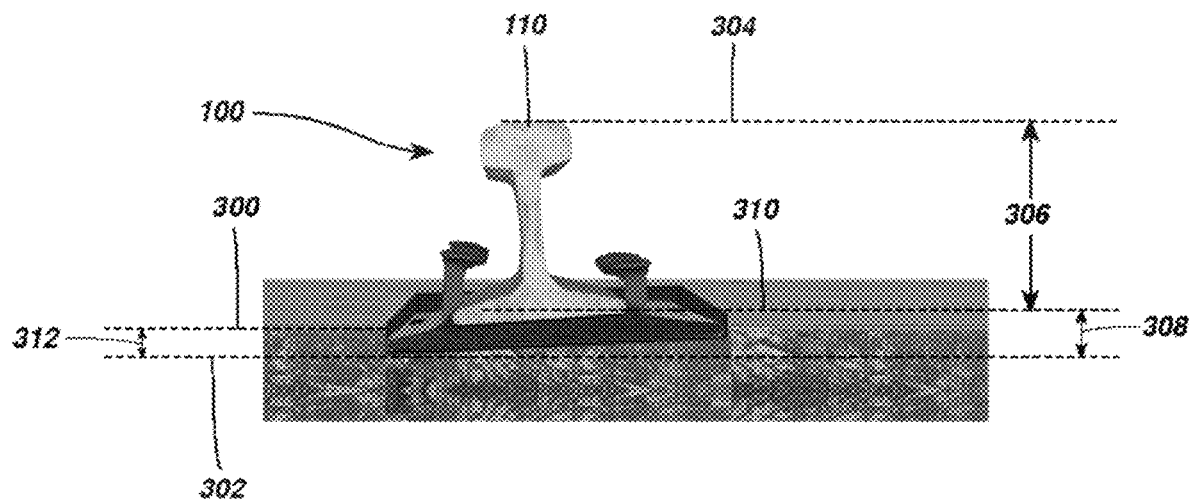
FIG. 13 shows determination of a plate cut value according to one embodiment of the present disclosure.

In order to extend the ability to estimate plate cut measures in areas with obscured crosstie plates (FIG. 4), embodiments of the present disclosure include measurements referenced to a top surface of the rail 100 or rail head 110 as shown in FIG. 13, the surface on which the wheels of a train travel, which is an area of the track structure which is never obscured. Plate cut measurements referenced from an elevation of the top of the rail 100 along the rail head 110 produce valid plate cut values, even in conditions where the presence of ballast, debris or foliage in and around the track obscures all but the top surface of the rail head and a small portion of the surface of the crosstie.

Methods disclosed herein determine a difference between a wooden crosstie surface elevation 300 and an estimated tie plate base elevation 302. The improved rail head surface elevation method described herein measures a rail head surface elevation 304 as a reference elevation and calculates a vertical offset from the rail head surface elevation 304 to establish the estimated tie plate base elevation 302. This vertical offset is calculated as the sum of an estimated rail height 306 and an estimated tie plate thickness 308. The total height of the entire rail is the sum of both the "estimated rail height" 306 (which includes the distance from the rail head surface elevation 304 to a rail base surface elevation 310) plus the estimated tie plate thickness 308. A plate cut measurement 312 based on rail head surface elevation (which is insensitive to the presence of rail base surface debris) may be determined, for example, as follows:

Plate Cut Measurement=Crosstie Surface Elevation−(Rail Head Surface Elevation−(Rail Height Estimate+Estimated Crosstie Plate Thickness))   Equation 3:

Estimated rail height 306 may be determined, for example, from a) the specifications of known rail sizes and types, b) by using a representative fixed elevation estimate, or c) by calculating the elevation difference between the rail head and rail base top surface at regular intervals along the length of the track.

Exemplary methods of determining the estimated rail height 306 can include analyzing data collected on the track assessment system 200, including location data from one or both of the encoder 216 and GPS antenna 232 to determine a position at which measurements of the rail assembly are taken. Location data may be used to determine a particular type of rail used based on data provided by an owner or operator of a particular railway, such data accessed directly from an onboard data storage device (e.g., the data storage device 206) or wirelessly from a remote data storage device. For example, an owner or operator of a railway may provide data regarding the manufacturer and size of a rail used at particular locations of the railway, and the estimated rail height 306 may be determined based on known dimensions of the rail available from the manufacturer.

Figure 14:
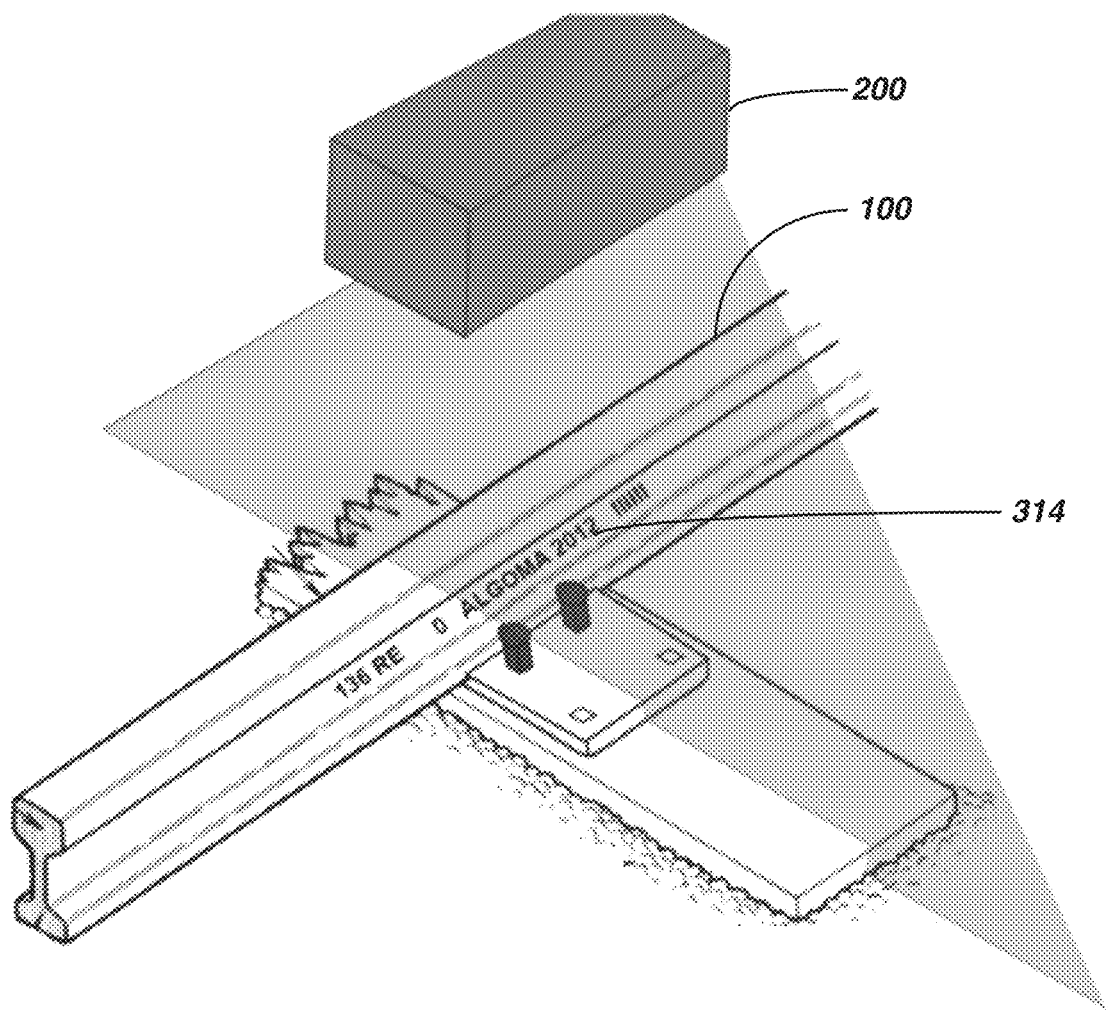
FIG. 14 illustrates detection of visual indicators on a rail according to one embodiment of the present disclosure.

In another exemplary method, data collected from the track assessment system 200 may be analyzed to detect visual marks or indicators 314 located on the rail, as shown in FIG. 14. Visual indicators may include marks from the manufacturer that may be used to identify information such as the manufacturer of the rail and type or model of rail supplied by the manufacturer. Data collected by the track assessment system 200 may include visual data that captures the visual marks or indicators 314. The collected data may be analyzed using automated machine vision, optical character recognition (OCR), or other known methods to identify the visual marks or indicators 314. After identifying the visual marks or indicators 314, the estimated rail height 306 may be determined based on data available from the manufacturer, such data accessed directly from an onboard data storage device (e.g., the data storage device 206) or wirelessly from a remote data storage device.

In yet another exemplary method, the estimated rail height 306 (FIG. 13) may be determined based on detecting differences in elevation of the rail head 110 and a rail base surface 118 using the track assessment system 200 of FIGS. 9-11. Measurements may be taken at regular intervals along a length of track using sensors 212 of the track assessment system 200, and the estimated rail height 306 of FIG. 13 may be derived from elevation data collected by sensors 212 of the track assessment system 200.

The estimated tie plate thickness 308 shown in FIG. 13 may also be estimated using various methods. For example, the estimated tie plate thickness 308 may be determined based on a representative fixed value provided by an owner or operator of a railway. In another example, visual data of the tie plate 102 may be analyzed, such as using known methods of machine vision, to identify the tie plate 102 based on dimensions of the tie plate, size and number of fastening holes, and other visual information of the tie plate 102 captured by the track assessment system 200. Image processing algorithms may be used to compare visual information of the tie plate 102 with previously acquired tie plate data, or 3D feature classification algorithms may be used to compare elevation information with previously acquired tie plate elevation models, such tie plate data and models accessed directly from an onboard data storage device (e.g., the data storage device 206) or wirelessly from a remote data storage device.

Figure 1:
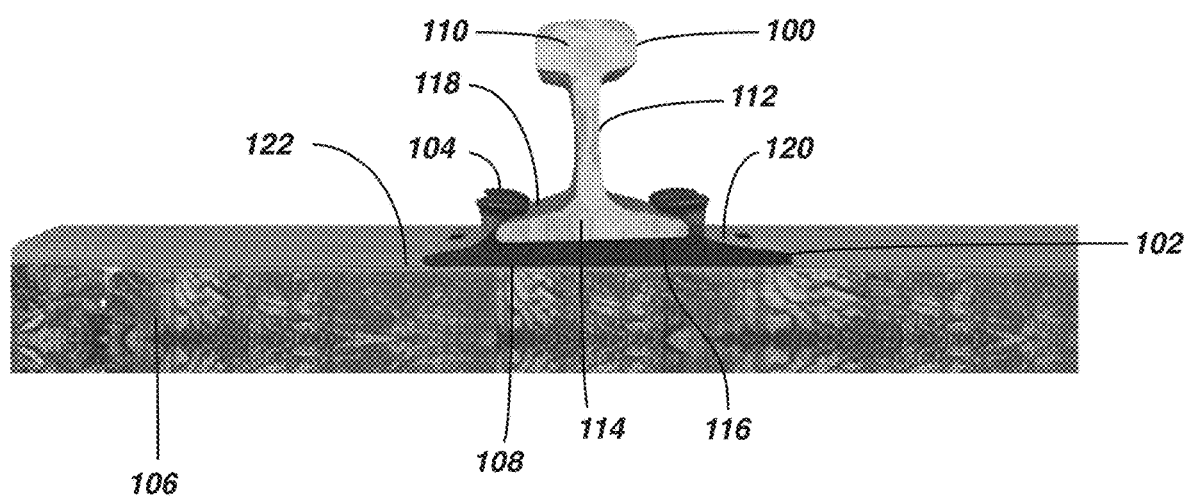
FIG. 1 shows a wooden crosstie rail assembly according to one embodiment of the present disclosure.
Figure 2:
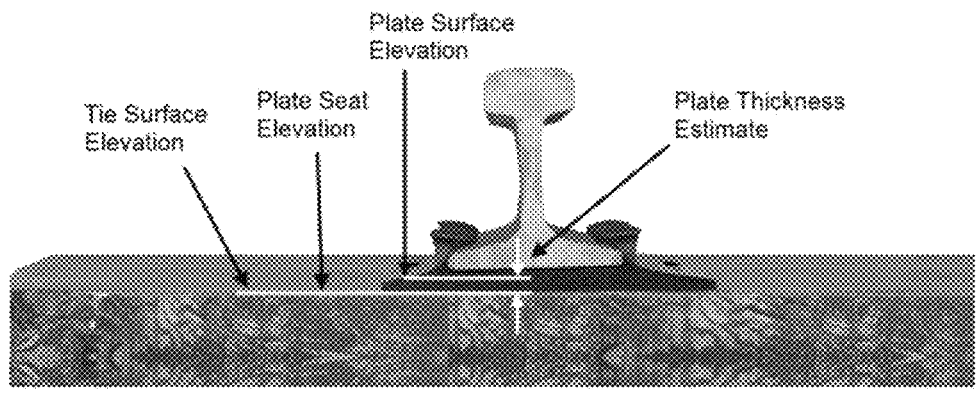
FIGS. 2 and 3 show prior methods of determining of plate cut according to one embodiment of the present disclosure.
Figure 3:
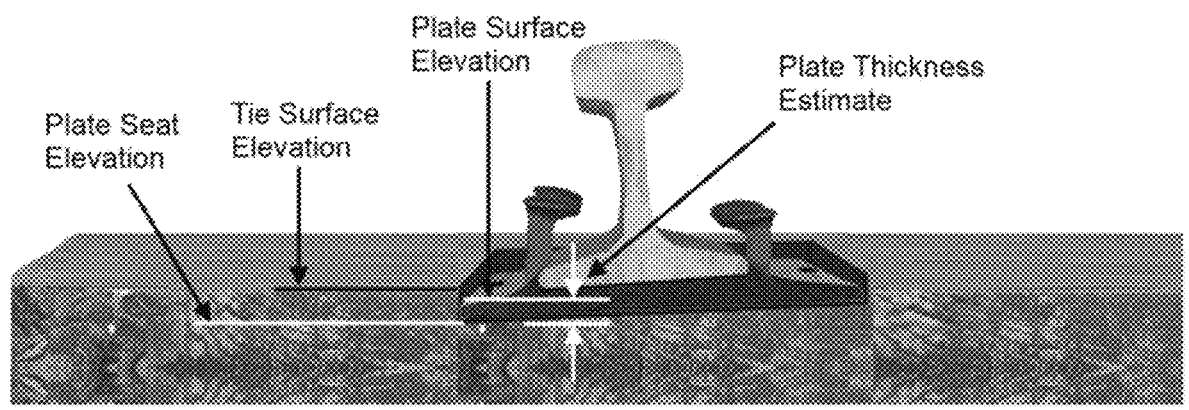
Figure 15:
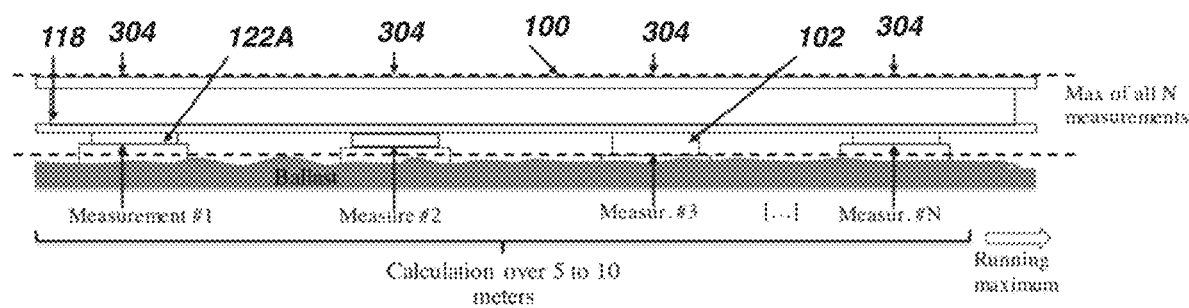
FIG. 15 illustrates estimation of a rail height and plate thickness based along a length of track according to one embodiment of the present disclosure.

Referring to FIG. 15, in another embodiment, estimated tie plate thickness 308 may be determined by calculating a running maximum elevation difference between the rail base surface 118 (at the rail base surface elevation 310 of FIG. 13) and the upper crosstie surface 122 of FIG. 1 (at the upper crosstie surface elevation 300 of FIG. 13). The maximum elevation difference between the rail base surface 118 and the upper crosstie surface 122 shown in FIG. 15 may be measured N times along a certain distance, such as from about 5 meters to about 10 meters of track, and a maximum value of the N measurements may be used as the estimated tie plate thickness 308 (FIG. 13).

Figure 16:
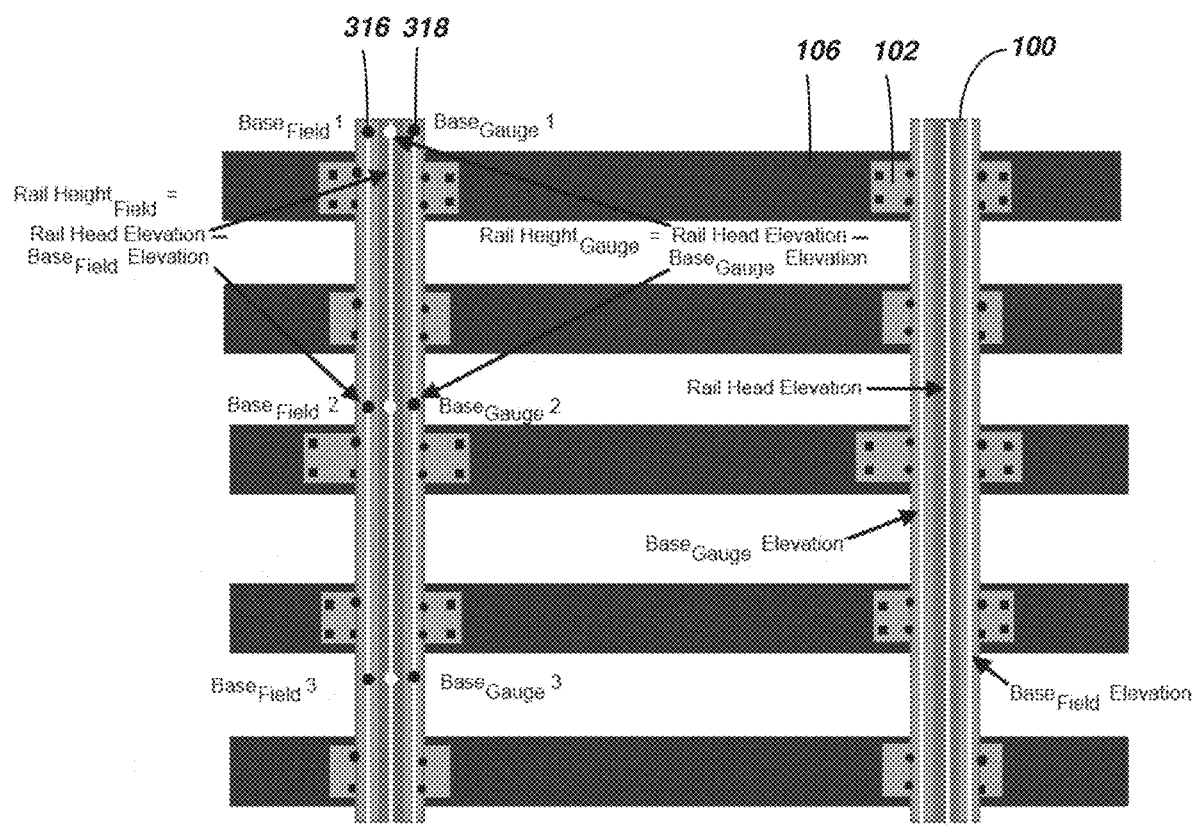
FIG. 16 shows a top view of a track according to one embodiment of the present disclosure.

FIG. 16 shows an overhead view of a track as viewed from sensors of the track assessment system 200. Estimating tie plate thickness can be performed on both field and gauge sides of a track. Sensors 212 of the track assessment system 200 may measure the rail head surface elevation 304 relative to a rail base field elevation 316 and a rail base gauge elevation 318. Field and gauge rail height calculations may be determined based on the following two equations:

$$\text{Field Rail Height} = \text{Rail Head Elevation} - \text{Field Rail Base Elevation} \qquad \text{Equation 4:}$$

$$\text{Gauge Rail Height} = \text{Rail Head Elevation} - \text{Gauge Rail Base Elevation} \qquad \text{Equation 5:}$$

Figure 17:
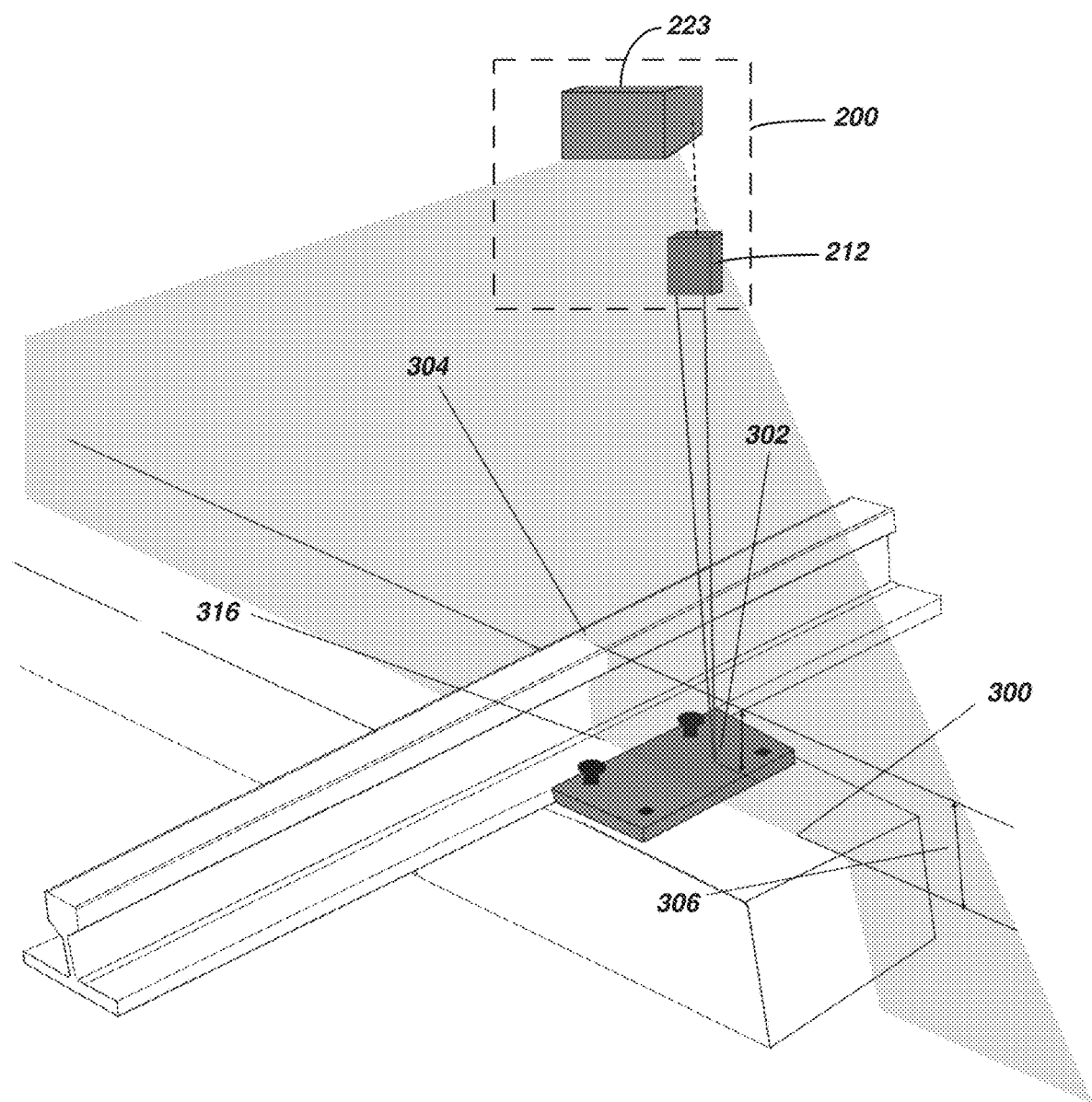
FIG. 17 shows arrangement of a track assessment system and sensors above a rail assembly according to one embodiment of the present disclosure.
Figure 18:
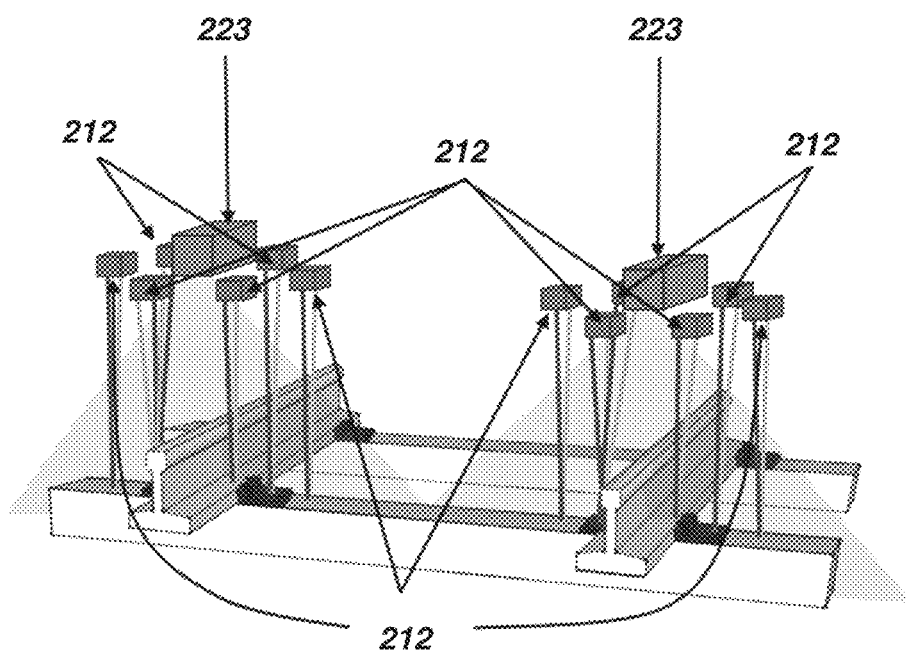
FIG. 18 shows an alternative arrangement of sensors above a track according to one embodiment of the present disclosure.

Various sensors and technologies may be employed to determine elevations of components of the track and to provide additional measurements when calculating rail height, rail base thickness, or tie plate thickness estimates. These technologies can include fixed point or LiDAR based Time of Flight ToF range sensors referenced to 3D triangulation elevation measurement systems. FIGS. 17 and 18 both show three-dimensional triangulation and measurement of a track surface (such as using the track assessment system 200 described herein) including time of flight technologies.

In order to extend the ability to estimate rail seat abrasion (RSA) measurement in areas with obscured rail base surfaces, the rail base seat elevation measures can be referenced to the top surface of the rail head 110, the surface on which the wheels travel, is an area of the track structure which is never obscured. Rail seat abrasion measurements referenced from the rail head elevation produce valid RSA measures, even in conditions where the presence of ballast, debris or foliage in and around the track obscures all but the top surface of the rail head and a small portion of the crosstie surface.

Figure 19:
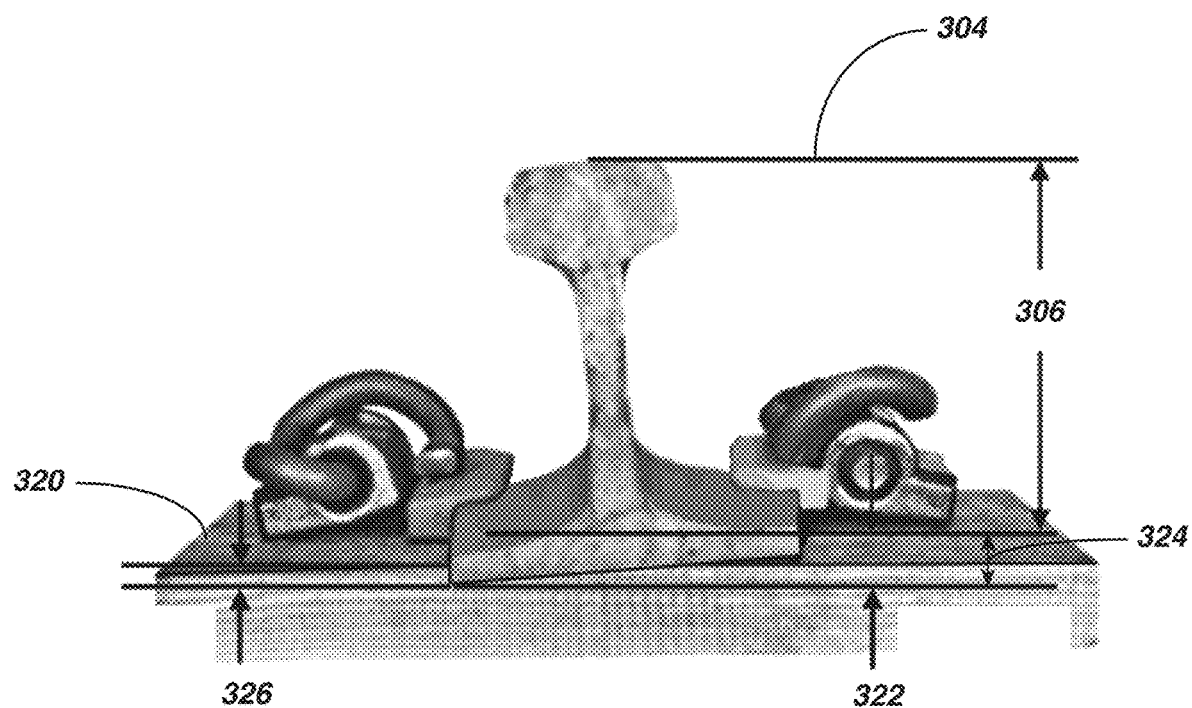
FIG. 19 shows determination of a rail seat abrasion value according to one embodiment of the present disclosure.

Methods and embodiments of the present disclosure are further capable of determining a rail seat abrasion (RSA) value of a section of track. Referring to FIG. 19, RSA may be calculated based on a difference between a concrete crosstie surface elevation 320 and an estimated elevation of a rail base seat 116 (FIG. 1) (such elevation referred to herein as a rail base seat elevation 322). The rail head surface elevation 304 is used as a reference elevation and calculates a vertical offset from the reference elevation to the rail base seat elevation 322. The calculated vertical offset combines estimated rail height 306 and estimated rail base thickness 324 measurements to calculate a total rail height. A RSA value 326 of the track may be calculated such that the measurement is insensitive to the presence of surface debris on any rail foot or crosstie plate. For example, a RSA value may be determined as follows:

$$\text{Rail Seat Abrasion} = \text{Crosstie Surface Elevation} - (\text{Rail Head Elevation} - (\text{Rail Height Estimate} + \text{Rail Base Thickness Estimate})). \qquad \text{Equation 6:}$$

Figure 20:
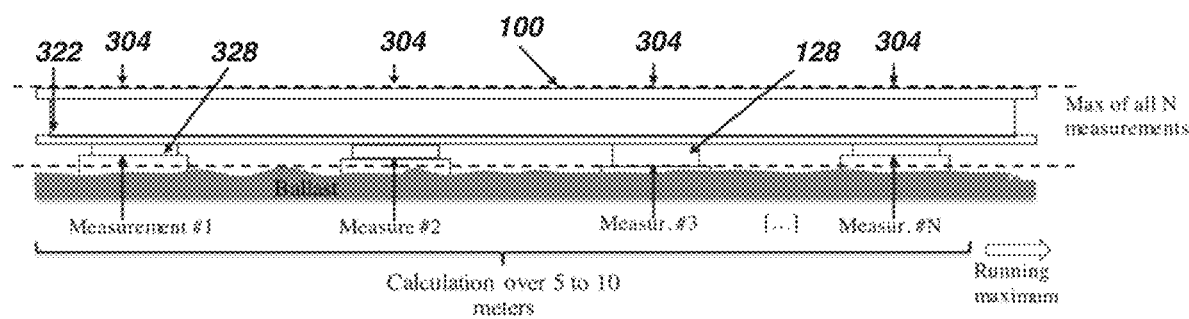
FIG. 20 shows estimation of rail base height and thickness along a length of track according to one embodiment of the present disclosure.

With further reference to FIG. 19 and FIG. 20, an improved rail head elevation derived rail base elevation determination method is provided. The combined rail height 306, rail base thickness 324 and thickness of an underlying pad 128 can be determined in-situ using various suitable methods. For example, specifications of known rail and pad sizes and types may be known based on a location of track or by manufacturing marks present on the rail. Alternatively, a representative fixed rail height and pad thickness estimate may be used to calculate RSA. In another example, maximum differences between the rail head elevation 304 and a top surface of the concrete crosstie elevation 328 are calculated at intervals along the length of the track, as shown in FIG. 20.

Figure 21:
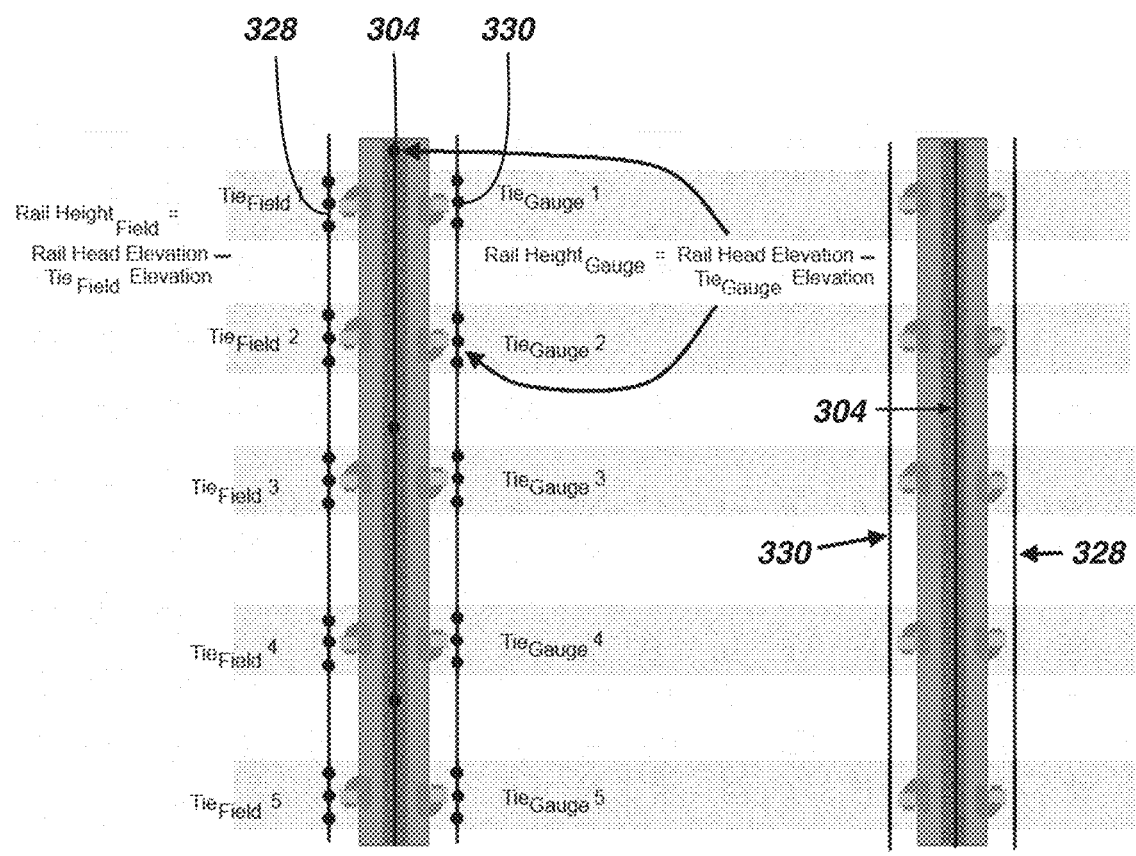
FIG. 21 shows a top view of a track according to one embodiment of the present disclosure.

Referring now to FIG. 21, both field and gauge rail heights may be calculated based on elevation measurements of the track. The rail head surface elevation 304 may be measured according to embodiments described herein. Further, both a crosstie surface field side elevation 328 and a crosstie surface gauge side elevation 330 may be measured at multiple points along a length of the track. Based on both field and gauge side measurements, field side total rail height elevations and gauge side total rail height elevations may be calculated as follows:

Field Side Total Rail Height=Rail Head Elevation−
(Field Side Crosstie Elevation+Pad Thickness)     Equation 7:

Gauge Side Total Rail Height=Rail Head Elevation−
(Gauge Side Crosstie Elevation+Pad Thickness)     Equation 8:

The combined rail height and rail base thickness (collectively, the "total rail height"), plus pad thickness can be determined by calculating a running maximum of a difference of the rail head surface elevation 304 to the concrete crosstie surface elevation 328, as shown in FIG. 20. The maximum crosstie surface and rail head elevation difference values over an extended distance (5 m to 10 m for example) would typically be representative of crossties with no RSA occurring. This maximum value would be an accurate installed total rail height and pad thickness estimate. This installed total rail height and pad thickness estimate offset would be calculated for both the field and gauge sides of both rails.

Figure 22:
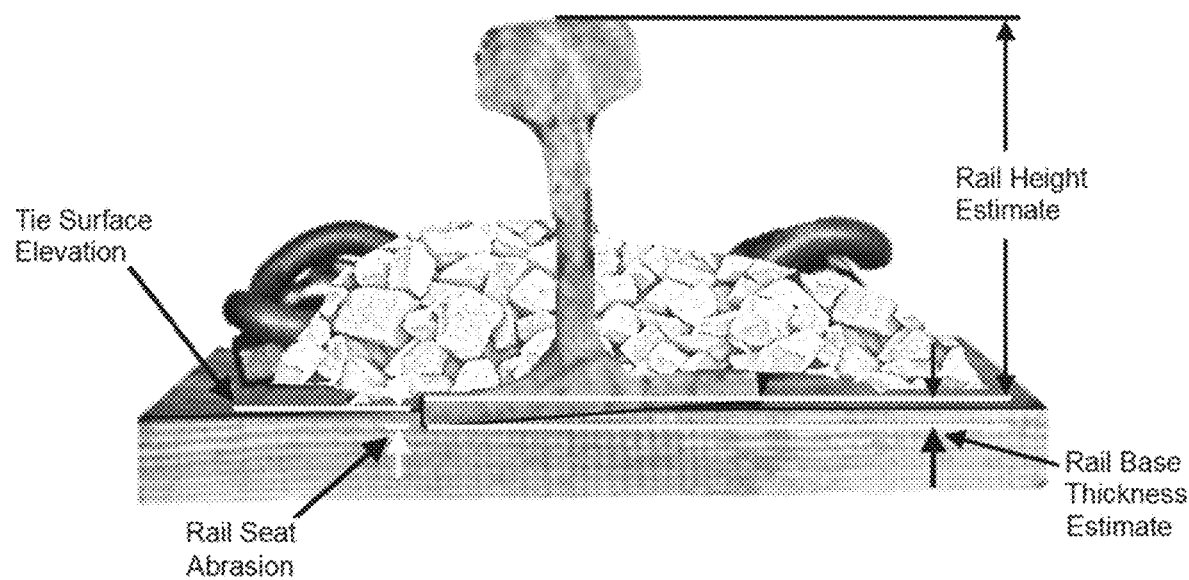
FIG. 22 shows determination of a rail seat abrasion value of a rail assembly including ballast according to one embodiment of the present disclosure.
Figure 23:
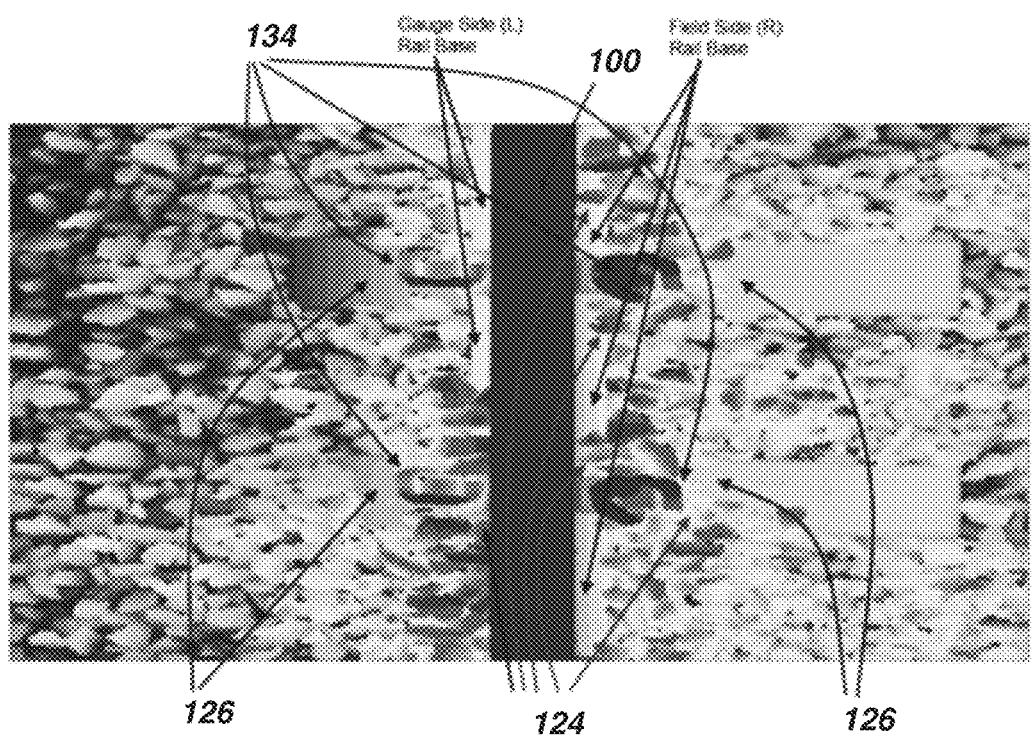
FIG. 23 shows a view of a rail assembly from sensors of a track assessment system according to one embodiment of the present disclosure.

The calculation of the rail seat elevation based on the difference in rail head elevation and combined rail height and rail base thickness measurement allows calculating RSA measurements in situations where the rail base is obscured with track debris, such as ballast stones. The presence of track debris, and ballast stones in particular, on the top surface of the rail base (e.g., the rail foot and crosstie plates) is a common occurrence. FIG. 22 shows a method of RSA measurement in the presence of ballast as follows:

Rail Seat Abrasion=Crosstie Surface Elevation−(Rail
Head Elevation−(Rail Height Estimate[including
rail head and rail web]+Rail Base Thickness
Estimate))     Equation 9:

The method described above is insensitive to the presence of debris on the rail base surface. For example, FIG. 23 shows a top view of a rail assembly including a top view of the rail 100, clips 134, and visible portions of the concrete crosstie 126. As shown, portions of the clips 134 and the corresponding rail base surface are obscured by ballast stones such that portions of the clips 134 and the rail base surface are not visible to sensors of the track assessment system 200 analyzing the rail assembly, thereby making conventional RSA measurements impossible.

Figure 24:
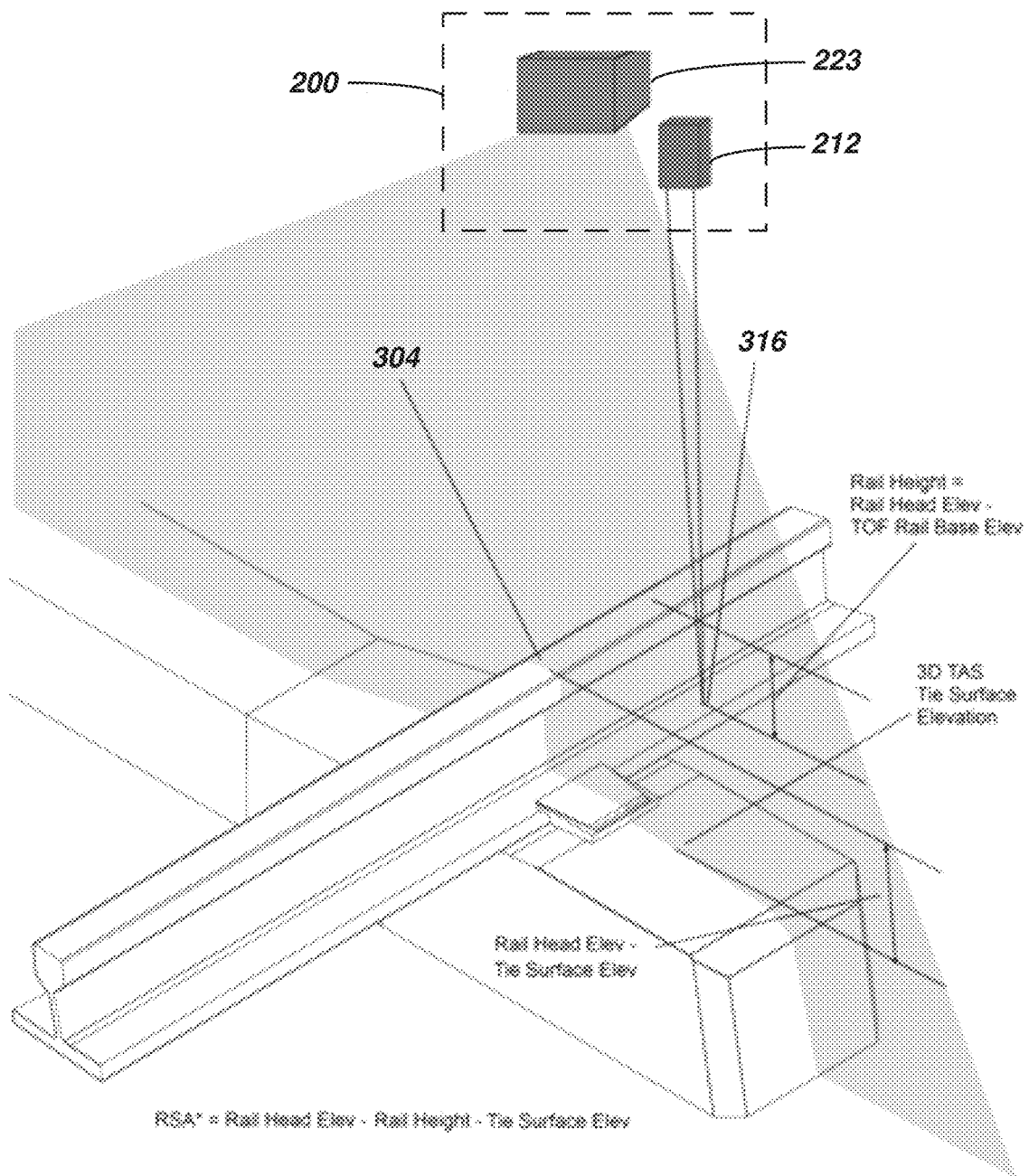
FIG. 24 shows arrangement of a track assessment system above a rail assembly according to one embodiment of the present disclosure.

Referring now to FIG. 24, various suitable technologies may be employed to determine elevations along the rail base to provide additional measurements when calculating the rail height and rail base thickness estimates. These technologies can include fixed point pulsed laser Time of Flight (ToF) or LiDAR based range sensors referenced with respect to the track assessment system 200. These combined features are shown for example in FIG. 24. In the example of FIG. 24, both ToF sensors of the track assessment system 200 may measure various elevations of the rail head, rail base, and other components of the rail assembly to determine RSA values as described herein.

Figure 25:
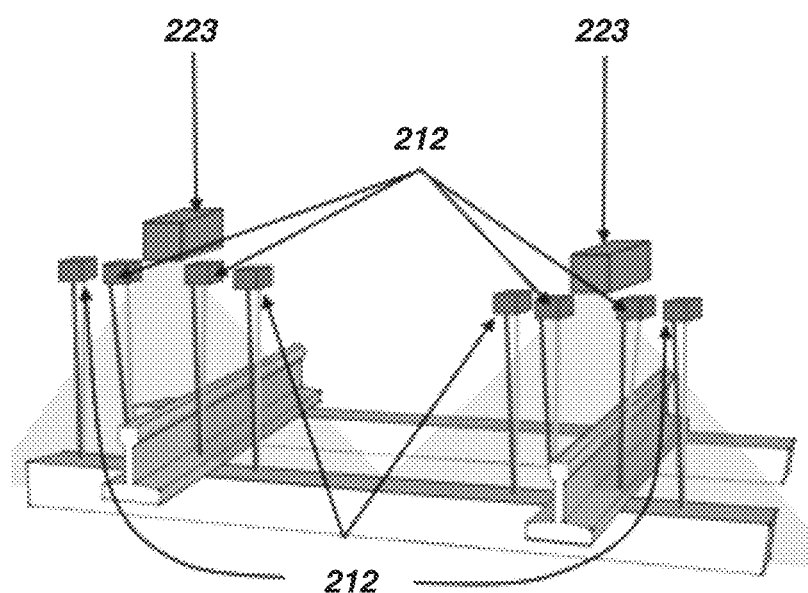
FIG. 25 shows arrangement of sensors above a track according to one embodiment of the present disclosure.

The fixed-point Time of Flight or LiDAR sensors can be positioned to provide measurements for rail base, rail head and crosstie surface elevations for both the field and gauge side of each rail. These systems would be capable of providing real-time rail seat abrasion measures in both clear rail base and obscured rail base scenarios. FIG. 25 shows an RSA detection system combining both 3D triangulation and time of flight elevation measurements.

In operation, the track assessment system 200 scans an underlying track, and the track assessment system 200 preferably moves along the track to gather data at various points along the track. Data from the track assessment system includes elevational data corresponding to an elevation of the rail head and an elevation of a top surfaces of crossties. Elevation data may be stored on the data storage device 206 (FIG. 9) for subsequent analysis. Further, data corresponding to estimated rail heights and other parameters discussed herein may be stored on the data storage device 206 so that such data is accessible to the processor 202. Collected data stored on the data storage device 206 can be processed to determine plate cut or rail seat abrasion measurements to indicate whether portions of a track require maintenance or repair. Collected data stored on the data storage device 206 may be analyzed in real-time as data is collected by sensors or may be analyzed after collection for subsequent remediation.

Figure 26:
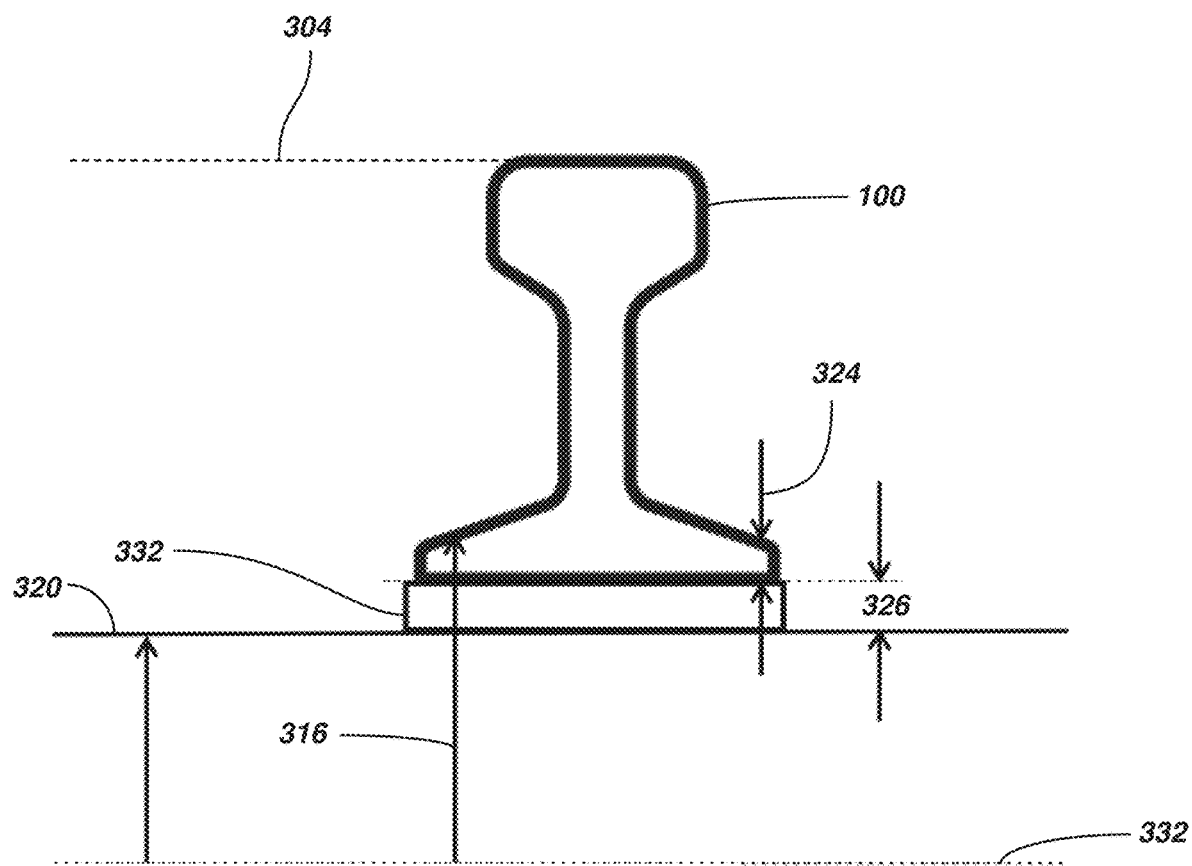
FIG. 26 is an illustration of a reference axis for determining elevations of a rail assembly according to one embodiment of the present disclosure.

Embodiments of the present disclosure refer to an elevation or surface elevation of various components of a rail assembly, such as the concrete crosstie surface elevation 320, rail head surface elevation 304, and other surface elevations. As shown in FIG. 26, a surface elevation may be based on a reference axis 332. The reference axis 332 may be an arbitrary distance from the track assessment system 200 and other sensors detecting an elevation. For example, in the equations disclosed herein, the reference axis 332 is assumed to be located below the concrete crosstie surface elevation 320 and other components of the rail assembly. As shown in FIG. 26, the concrete crosstie surface elevation 320 is determined to be the distance between a top of the concrete crosstie 320 and the reference axis 332. However, it is also understood that the reference axis 332 may be located above the rail assembly, and one having ordinary skill in the art would recognize suitable equations for determining plate cut and rail seat abrasion measures based on the reference axis 332 being located above the rail assembly. In yet another embodiment, the reference axis 332 may be located at the same location as sensors of the track assessment system 200 and an elevation may be determined based on a distance from sensors of the track assessment system 200 to each respective surface of the rail assembly.

Figure 27:
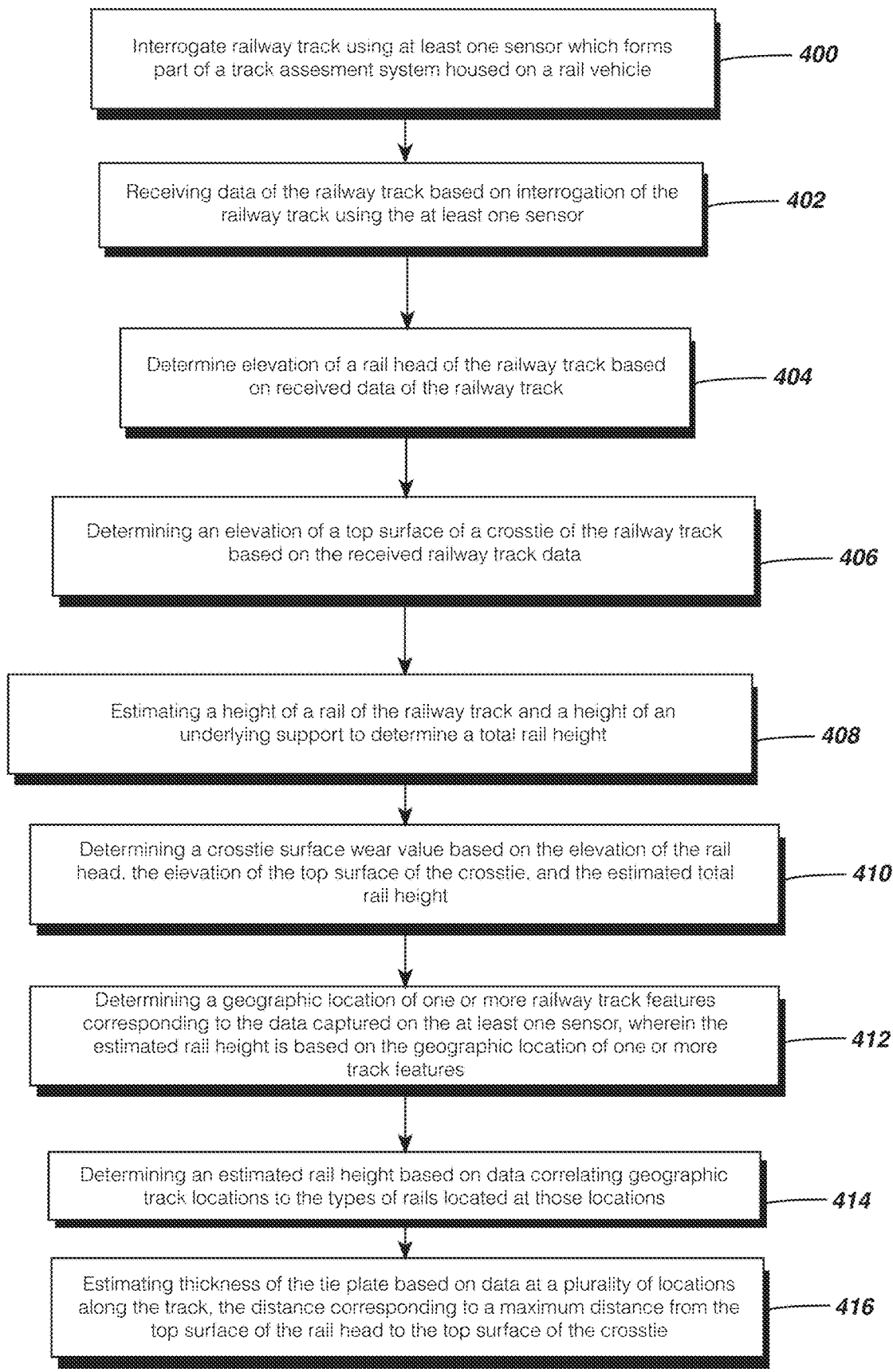
FIG. 27 is a flow chart showing method steps for a method for detecting and measuring plate cut or rail seat abrasion in environments where all or portions of crosstie plates (if applicable) and/or other components of the rail assembly are obscured by debris such as ballast stones.

Methods and embodiments described herein advantageously allow for the detection and measurement of plate cut and rail seat abrasion in environments where all or portions of crosstie plates and other components of the rail assembly are obscured by debris such as ballast stones. One embodiment as shown in FIG. 27 and includes the steps of 400 interrogating a railway track using at least one sensor which forms part of a track assessment system housed on a rail vehicle; 402 receiving data of the railway track based on the interrogation of the railway track using the at least one sensor; 404 determining an elevation of a rail head of the railway track based on the received data; 406 determining an elevation of a top surface of a cross crosstie of the railway track based on the received data; 408 estimating a height of a rail of the railway track and a height of an underlying rail support to obtain a total rail height; 410 determining a crosstie surface wear value based on the elevation of the rail head, the elevation of the top surface of the crosstie, and the estimated total rail height. The method may further include the step of 412 determining a geographic location of one or more railway track features corresponding to the data captured on the at least one sensor, wherein the estimated rail height is based on the geographic location of the one or more railway track features. Step 412 may further comprise the step of 414 determining an estimated rail height by using the processor to access a database which includes data which correlates specific geographic track locations to the identities of the specific types of rails placed at those geographic track locations. For wooden crossties which are situated adjacent to crosstie plates, an additional step can include 416 estimating a thickness of the tie plate based on received data at a plurality of locations along a length of track, wherein the estimated tie plate thickness is based on a maximum distance from the top surface of the rail head to the top surface of the rail crosstie along the length of track.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A system for inspecting a railway track, the system comprising:
   a processor;
   at least one sensor oriented to capture data of the railway track and mountable on a rail vehicle for moving the at least one sensor along the railway track, the at least one sensor in electronic communication with the processor;
   a data storage device in electronic communication with the processor; and
   computer executable instructions stored on a computer readable storage medium in communication with the processor operable to:
      determine an elevation of a surface of a rail head of a rail located on the railway track based on a distance to the rail head from the at least one sensor;
      determine an elevation of a surface of a crosstie of the railway track based on a distance to a top surface of the crosstie from the at least one sensor;
      estimate a total rail height of the rail and underlying rail support height of an underlying rail support; and
      calculate a crosstie wear value based on the determined rail head surface elevation, crosstie surface elevation, and estimated total rail height and underlying rail support height;
   wherein the crosstie wear value is calculated without requiring the at least one sensor to capture data from which a surface elevation of the underlying rail support can be directly measured.

2. The system for inspecting a railway track of claim 1, wherein the at least one sensor is located on a rail vehicle, the system for inspecting a railway track further comprising an encoder located adjacent a wheel of the rail vehicle and in communication with the processor to provide location data of the rail vehicle.

3. The system for inspecting a railway track of claim 1, the at least one sensor further comprising a light emitter and a camera in communication with the processor, wherein the camera captures a field of view of the railway track including reflected light from the light emitter to generate a three-dimensional elevation map of the railway track.

4. The system for inspecting a railway track of claim 1, wherein the at least one sensor comprises a time of flight sensor.

5. The system for inspecting a railway track of claim 1, further comprising a GPS antenna in communication with the processor for detecting a location of the system.

6. The system for inspecting a railway track of claim 1, wherein the one or more sensors comprise at least one camera and associated light emitter and at least one time of flight sensor.

7. A method of determining wear of a railway track, the method comprising:
   interrogating a railway track using at least one sensor which forms part of a track assessment system housed on a rail vehicle for moving the at least one sensor along the railway track;
   receiving data corresponding to the railway track from the interrogation of the railway track using the at least one sensor;
   determining an elevation of a rail head of the railway track based on the received data;
   determining an elevation of a top surface of a rail crosstie of the railway track based on the received data;
   estimating a total rail height of a rail of the railway track and a height of an underlying rail support;
   determining a crosstie wear value based on the elevation of the rail head, the elevation of the top surface of the crosstie, the estimated total rail height, and the estimated height of the underlying rail support;
   wherein the crosstie wear value is calculated without requiring the at least one sensor to capture data from which a surface elevation of the underlying rail support can be directly measured.

8. The method of claim 7, wherein the estimated total rail height is determined based on one or more visual indicators displayed on the rail which are visually captured by the at least one sensor and compared by the processor to a database of rail markings used by the manufacturer of the rail.

9. The method of claim 7, further comprising determining a geographic location of one or more railway track features corresponding to the data captured on the at least one sensor, wherein the estimated total rail height is determined based on the geographic location of the one or more railway track features.

10. The method of claim 9, further comprising the step of determining an estimated total rail height by using the processor to access a database which includes data which correlates specific geographic track locations to the identities of the specific types of rails placed at those geographic track locations.

11. The method of claim 7, wherein the underlying rail support comprises a tie plate and the step of estimating a total rail height of a rail of the railway track and a height of an underlying rail support further comprises estimating a thickness of the tie plate.

12. The method of claim 11, further comprising estimating a thickness of the tie plate based on received data at a plurality of locations along a length of track, wherein the estimated tie plate thickness is determined based on a maximum distance from the top surface of the rail head to the top surface of the crosstie along the length of track.

13. The method of claim 11, wherein the rail wear value is a plate cut value corresponding to an amount that the tie plate has cut into a top surface of the crosstie.

14. The method of claim 7, wherein the crosstie is a concrete crosstie, and wherein the rail wear value is a rail seat abrasion value corresponding to an amount that a rail base seat has cut into a top surface of the concrete crosstie.

15. The method of claim 7 wherein the underlying rail support comprises a pad, wherein the crosstie is a concrete crosstie, and wherein the step of estimating a total rail height of a rail of the railway track and a height of an underlying rail support further comprises estimating a thickness of the pad.

16. The method of claim 15, further comprising estimating a thickness of the pad based on received data at a plurality of locations along a length of track, wherein the estimated pad thickness is determined based on a maximum distance from the top surface of the rail head to the top surface of the crosstie along the length of track.

\* \* \* \* \*